(12) United States Patent
Vaez-Iravani et al.

(10) Patent No.: US 11,204,330 B1
(45) Date of Patent: Dec. 21, 2021

(54) SYSTEMS AND METHODS FOR INSPECTION OF A SPECIMEN

(71) Applicant: KLA-Tencor Technologies Corporation, Milpitas, CA (US)

(72) Inventors: Mehdi Vaez-Iravani, Los Gatos, CA (US); Eliezer Rosengaus, Palo Alto, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 1137 days.

(21) Appl. No.: 14/788,700

(22) Filed: Jun. 30, 2015

Related U.S. Application Data

(63) Continuation of application No. 11/374,711, filed on Mar. 14, 2006, now Pat. No. 9,068,917.

(51) Int. Cl.
*G01N 21/00* (2006.01)
*G01N 21/88* (2006.01)

(52) U.S. Cl.
CPC .............................. *G01N 21/8806* (2013.01)

(58) Field of Classification Search
CPC .......... G01N 21/8806; G01N 21/9501; G01N 21/95607; G01N 2021/479; G01N 2021/8825; G01N 2021/95676; G01N 2201/06113; G02B 17/0808; G02B 17/0856; G02B 17/0892; G02B 21/04; G03F 7/70225
See application file for complete search history.

(56) References Cited

U.S. PATENT DOCUMENTS

| | | | | | |
|---|---|---|---|---|---|
| 5,262,893 A | * | 11/1993 | Shrauger | .............. | G02B 5/1871 359/565 |
| 5,313,542 A | * | 5/1994 | Castonguay | ......... | G01N 21/474 250/227.28 |
| 5,463,459 A | * | 10/1995 | Morioka | ................ | B82Y 15/00 257/E21.53 |

(Continued)

FOREIGN PATENT DOCUMENTS

GB        1410112 A * 10/1975    ......... G01N 21/5911

OTHER PUBLICATIONS

Ophir, Laser Beam Vocabulary, 2016.*

*Primary Examiner* — Mohamed K Amara
(74) *Attorney, Agent, or Firm* — Ann Marie Mewherter

(57) ABSTRACT

Systems and methods for inspection of a specimen are provided. One system includes an illumination subsystem configured to illuminate the specimen by scanning a spot across the specimen. The system also includes a non-imaging detection subsystem configured to generate output signals responsive to light specularly reflected from the spot scanned across the specimen. In addition, the system includes a processor configured to generate images of the specimen using the output signals and to detect defects on the specimen using the images. In one embodiment, the non-imaging detection subsystem includes an objective and a detector. An NA of the objective does not match a pixel size of the detector. In another embodiment, the non-imaging detection subsystem includes an objective having an NA of greater than about 0.05. The system may be configured for multi-spot illumination and multi-channel detection. Alternatively, the system may be configured for single spot illumination and multi-channel detection.

86 Claims, 14 Drawing Sheets

(56) References Cited

U.S. PATENT DOCUMENTS

| | | | | |
|---|---|---|---|---|
| 5,555,087 A * | 9/1996 | Miyagawa | G01J 3/453 | 356/485 |
| 5,576,831 A * | 11/1996 | Nikoonahad | G01N 21/9501 | 250/559.27 |
| 6,064,517 A * | 5/2000 | Chuang | G02B 13/12 | 359/351 |
| 6,122,046 A * | 9/2000 | Almogy | G01N 21/9501 | 356/237.2 |
| 6,180,415 B1 * | 1/2001 | Schultz | B82Y 30/00 | 356/301 |
| 6,208,411 B1 * | 3/2001 | Vaez-Iravani | G01N 21/956 | 356/237.2 |
| 6,370,406 B1 * | 4/2002 | Wach | G01N 21/474 | 356/301 |
| 6,608,676 B1 * | 8/2003 | Zhao | G01N 21/9501 | 250/559.27 |
| 6,738,505 B1 * | 5/2004 | Prince | B23K 3/08 | 356/237.5 |
| 6,765,724 B1 * | 7/2004 | Kramer | G02B 5/1866 | 356/328 |
| 6,791,680 B1 * | 9/2004 | Rosengaus | G01N 21/9501 | 356/237.2 |
| 7,436,503 B1 * | 10/2008 | Chen | G01N 21/9501 | 250/550 |
| 8,947,521 B1 * | 2/2015 | Hill | G01N 21/9501 | 348/295 |
| 9,068,917 B1 * | 6/2015 | Vaez-Iravani | G01N 21/00 | |
| 9,188,874 B1 * | 11/2015 | Johnson | G03F 7/70291 | |
| 10,234,400 B2 * | 3/2019 | Ahner | G01B 11/24 | |
| 2001/0052975 A1 * | 12/2001 | Biellak | G01N 21/47 | 356/237.3 |
| 2002/0030811 A1 * | 3/2002 | Schindler | G01N 21/6452 | 356/318 |
| 2002/0037149 A1 * | 3/2002 | Chen | G01N 21/645 | 385/147 |
| 2002/0093648 A1 * | 7/2002 | Nikoonahad | G01N 21/211 | 356/237.1 |
| 2002/0107650 A1 * | 8/2002 | Wack | G01N 21/211 | 702/81 |
| 2002/0182760 A1 * | 12/2002 | Wack | G01R 31/27 | 438/11 |
| 2002/0186368 A1 * | 12/2002 | Rosengaus | G01N 21/9501 | 356/237.2 |
| 2003/0025904 A1 * | 2/2003 | Sakai | G01N 21/94 | 356/237.2 |
| 2003/0058432 A1 * | 3/2003 | Drake | G01N 21/47 | 356/237.1 |
| 2003/0076594 A1 * | 4/2003 | Kramer | G02B 5/1866 | 359/569 |
| 2003/0210392 A1 * | 11/2003 | Vaez-Iravani | G01N 21/95623 | 356/237.2 |
| 2003/0227618 A1 * | 12/2003 | Some | G01N 21/9501 | 356/237.1 |
| 2004/0012775 A1 * | 1/2004 | Kinney | G01N 21/9501 | 356/237.2 |
| 2004/0027688 A1 * | 2/2004 | Lange | G02B 17/0808 | 359/726 |
| 2004/0042001 A1 * | 3/2004 | Vaez-Iravani | G01N 21/8806 | 356/237.2 |
| 2004/0095573 A1 * | 5/2004 | Tsai | G01N 21/8806 | 356/237.5 |
| 2004/0207836 A1 * | 10/2004 | Chhibber | G01N 21/4738 | 356/237.4 |
| 2004/0246476 A1 * | 12/2004 | Bevis | G01N 21/474 | 356/237.5 |
| 2006/0001877 A1 * | 1/2006 | Moriya | G01N 21/47 | 356/369 |
| 2006/0124874 A1 * | 6/2006 | Uto | G01N 21/9501 | 250/559.45 |
| 2006/0139629 A1 * | 6/2006 | Ohshima | G01N 21/47 | 356/237.2 |
| 2007/0030477 A1 * | 2/2007 | Hwang | G01N 21/9501 | 356/237.1 |
| 2007/0053204 A1 * | 3/2007 | Krohne | A61B 5/0068 | 362/574 |
| 2007/0081151 A1 * | 4/2007 | Shortt | G01N 21/47 | 356/237.2 |
| 2007/0146873 A1 * | 6/2007 | Ortyn | G01N 21/6458 | 359/386 |
| 2007/0222974 A1 * | 9/2007 | Zhao | G01N 21/8901 | 356/237.1 |
| 2008/0151339 A1 * | 6/2008 | Oouchida | G11B 7/127 | 359/15 |
| 2009/0052009 A1 * | 2/2009 | Yamamoto | C08F 220/34 | 359/299 |
| 2009/0169069 A1 * | 7/2009 | Kim | G06F 3/0317 | 382/124 |
| 2010/0060895 A1 * | 3/2010 | Oshima | G01N 21/47 | 356/369 |
| 2011/0158502 A1 * | 6/2011 | Meshulach | G01N 21/9501 | 382/145 |
| 2011/0242630 A1 * | 10/2011 | Koepf | G02B 27/0905 | 359/17 |
| 2012/0075625 A1 * | 3/2012 | Tamura | G01N 21/9501 | 356/237.5 |
| 2013/0050782 A1 * | 2/2013 | Heng | G01N 15/1434 | 358/494 |
| 2013/0286191 A1 * | 10/2013 | Ito | G01N 21/47 | 348/131 |
| 2013/0293880 A1 * | 11/2013 | Honda | G01N 21/9501 | 356/237.5 |
| 2014/0160470 A1 * | 6/2014 | Oku | G01N 21/9501 | 356/237.3 |
| 2015/0244142 A1 * | 8/2015 | Takehisa | G01N 21/956 | 348/131 |

* cited by examiner

SYSTEMS AND METHODS FOR INSPECTION OF A SPECIMEN

BACKGROUND OF THE INVENTION

1. Field of the Invention

This invention generally relates to systems and methods for inspection of a specimen. Certain embodiments relate to an inspection system that includes a non-imaging detection subsystem configured to generate output signals responsive to light specularly reflected from a spot scanned across the specimen and a processor configured to generate images of the specimen using the output signals.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing, etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. When inspecting specular or quasi-specular surfaces such as semiconductor wafers, bright field (BF) and dark field (DF) modalities are used. In BF inspection systems, collection optics are positioned such that the collection optics capture a substantial portion of the light specularly reflected by the surface under inspection. In contrast, in DF inspection systems, the collection optics are positioned out of the path of the specularly reflected light such that the collection optics capture light scattered by objects on the surface being inspected such as microcircuit patterns or contaminants on the surfaces of wafers.

In BF inspection systems such as the 2351 system that is commercially available from KLA-Tencor, San Jose, Calif., imaging optics are commonly used to direct the light specularly reflected from the surface being inspected to the surface of an imaging sensor (e.g., an array detector such as a charged coupled device (CCD) or photodiode array). The quality of the imaging optics is a crucial determinant of the image quality overall, and the imaging optics (e.g., the numerical aperture of the imaging optics) need to be carefully matched to the periodicity of the imaging detector (e.g., the periodicity of the detector pixels) to prevent sampling effects such as aliasing.

In DF inspection systems such as the AIT family of tools and the SP1 and SP2 tools that are commercially available from KLA-Tencor, an intense spot of light is commonly used (e.g., light generated by a monochromatic laser) to limit the extent (i.e., the area) of the surface being illuminated. The inspection systems are configured to collect scattered light from the surface under inspection using non-imaging optics (such as Fresnel lenses or curved mirrors) and to direct the collected light onto the surface of relatively large area sensors (such as photodiodes or photomultiplier tubes). The inspection systems are also configured to sequentially illuminate different regions of the surface under inspection by scanning the spot over the surface by either translating the surface under the optics of the inspection system or by steering the illumination beam using devices such as galvanometers, rotating polygonal mirrors, or acousto-optic deflectors. The DF inspection systems are configured to form a digital image by using knowledge of the position being illuminated at the time the sensor is sampled. Since the non-imaging or "acquisition" optics collect a substantially small portion of the light used for illumination, relatively intense light sources such as lasers are typically used in DF inspection systems to illuminate the spot on the surface under inspection such that sufficient photons can be collected to provide a sufficient signal-to-noise ratio for defect detection.

Some DF inspection systems are configured to scan multiple spots across the surface under inspection simultaneously. In such systems, a relatively sparse array of detectors can be used to increase the speed of data acquisition by parallelization. Such a system configuration requires somewhat more sophisticated imaging optics than single spot DF inspection systems, but the tolerances of the optics can be substantially relaxed from those used in bright field systems.

Accordingly, it would be advantageous to develop systems and methods for BF inspection of a specimen such as a wafer that can produce adequate quality images of the specimen without requiring high quality imaging optics, without matching the optics to the periodicity of the detector, and without causing sampling effects such as aliasing, that allows the use of optics having a relatively high numerical aperture to increase the efficiency of light collection, that allows the use of detectors having a relatively high gain, that is less expensive than other bright field inspection systems, or some combination thereof.

SUMMARY OF THE INVENTION

The following description of various system and method embodiments is not to be construed in any way as limiting the subject matter of the appended claims.

One embodiment relates to a system configured to inspect a specimen. The system includes an illumination subsystem configured to illuminate the specimen by scanning a spot across the specimen. The system also includes a non-imaging detection subsystem configured to generate output signals responsive to light specularly reflected from the spot scanned across the specimen. In addition, the system includes a processor configured to generate images of the specimen using the output signals and to detect defects on the specimen using the images.

In one embodiment, the non-imaging detection subsystem includes an objective and a detector. In one such embodiment, a numerical aperture (NA) of the objective does not match a pixel size of the detector. In another embodiment, the non-imaging detection subsystem includes an objective having an NA of greater than about 0.05. In some embodiments, the system is configured to alter a sampling frequency of the non-imaging detection subsystem to alter a magnification of the images. In a further embodiment, the system is configured to select a sampling frequency of the non-imaging detection subsystem to substantially eliminate aliasing effects in the images. In an additional embodiment, the non-imaging detection subsystem includes an avalanche photodiode or a photomultiplier tube.

In one embodiment, the illumination subsystem includes a narrowband light source. In a different embodiment, the illumination subsystem includes a broadband light source. In one such embodiment, the non-imaging detection subsystem is configured to simultaneously generate different output signals responsive to different wavelengths of the light specularly reflected from the spot scanned across the specimen. In a different such embodiment, each of the output signals is responsive to multiple wavelengths of the light specularly reflected from the spot scanned across the specimen.

In another embodiment, the illumination subsystem is configured to illuminate the specimen by flood illumination. In one such embodiment, the non-imaging detection subsystem includes an array of fibers configured to collect the light specularly reflected from different portions of the spot scanned across the specimen. In this manner, the system may be configured for flood illumination of the specimen and collection by an array of fibers. Such an embodiment is, therefore, configured for single spot illumination and multi-channel detection. In addition, the specimen may be flood illuminated, and the magnified image of the specimen may be projected onto an array of fibers, a two-dimensional array of non-imaging detectors, or a two-dimensional multi-channel array of a non-imaging detector.

In another embodiment, the processor is configured to perform automatic defect classification. In an additional embodiment, an accuracy of the system is substantially independent of variations in the specimen caused by variations in a process performed on the specimen prior to inspection. In a further embodiment, the processor is configured to determine if the defects are nuisance defects.

In one embodiment, the illumination subsystem includes a fiber configured to direct light from a light source to an objective. The objective is configured to focus light from the fiber onto the specimen and to control a size of the spot on the specimen. In a different embodiment, the illumination subsystem is configured to illuminate the specimen by scanning multiple spots across the specimen simultaneously. In one such embodiment, the non-imaging detection subsystem is configured to simultaneously generate output signals responsive to light specularly reflected from the multiple spots scanned across the specimen. In this manner, the system may be configured for multi-spot illumination and multi-channel detection.

In some embodiments, the system includes an additional non-imaging detection subsystem configured to generate additional output signals responsive to light scattered from the spot scanned across the specimen. In one such embodiment, the processor is configured to detect the defects on the specimen using the additional output signals. In another such embodiment, the non-imaging detection subsystem and the additional non-imaging detection subsystem are configured to generate the output signals and the additional output signals substantially simultaneously.

In another embodiment, the illumination subsystem is configured to illuminate the specimen by scanning multiple spots across the specimen simultaneously. In one such embodiment, the system includes an additional non-imaging detection subsystem configured to simultaneously generate additional output signals responsive to light scattered from the multiple spots scanned across the specimen, and the processor is configured to detect the defects on the specimen using the additional output signals. In another such embodiment, the additional non-imaging detection subsystem is configured to generate the additional output signals while the non-imaging detection subsystem is generating the output signals.

In some embodiments, the system includes an additional non-imaging detection subsystem configured to generate additional output signals responsive to light specularly reflected from the spot scanned across the specimen. In one such embodiment, the output signals and the additional output signals are responsive to light having different polarizations. In an additional embodiment, the specimen includes a patterned wafer or a non-patterned wafer. The non-patterned wafer may include a wafer having a film formed thereon, a bare silicon wafer, or a wafer having a resist formed thereon. Each of the embodiments of the system described above may be further configured as described herein.

Another embodiment relates to a system configured to inspect a specimen. This system includes an illumination subsystem configured to illuminate the specimen by scanning a spot across the specimen. The system also includes an objective configured to collect light specularly reflected from the spot scanned across the specimen. An NA of the objective is greater than about 0.05. In addition, the system includes a non-imaging detector configured to detect the light collected by the objective and to generate amplified output signals responsive to the detected light. The NA of the objective is not matched to a pixel size of the non-imaging detector. The system further includes a processor configured to generate images of the specimen using the amplified output signals and to detect defects on the specimen using the images. This system embodiment may be further configured as described herein.

An additional embodiment relates to a method for inspecting a specimen. The method includes illuminating the specimen by scanning a spot across the specimen. The method also includes generating non-image output signals responsive to light specularly reflected from the spot scanned across the specimen. In addition, the method includes generating images of the specimen using the non-image output signals. The method further includes detecting defects on the specimen using the images. This method embodiment may include any other step(s) described herein.

BRIEF DESCRIPTION OF THE DRAWINGS

Other objects and advantages of the invention will become apparent upon reading the following detailed description and upon reference to the accompanying drawings in which.

Figure 1:
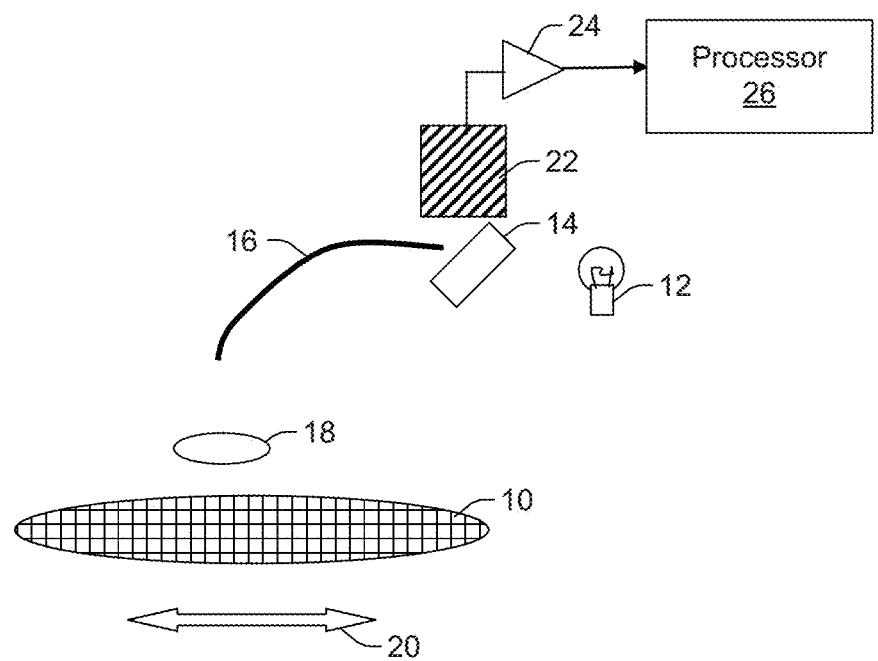
FIGS. 1-6 are schematic diagrams illustrating a side view of various embodiments of a system configured to inspect a specimen.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

As used herein, the term "specimen" refers to a wafer. As used herein, the term "wafer" generally refers to substrates formed of a semiconductor or non-semiconductor material. Examples of such a semiconductor or non-semiconductor material include, but are not limited to, monocrystalline silicon, gallium arsenide, and indium phosphide. Such substrates may be commonly found and/or processed in semiconductor fabrication facilities.

A wafer may include one or more layers formed upon a substrate. For example, such layers may include, but are not limited to, a resist, a dielectric material, and a conductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

Although embodiments are described herein with respect to wafers, it is to be understood that the systems and methods described herein may be used for inspection of any other specimen that would benefit from inspection that can be performed relatively quickly, relatively inexpensively, and to generate relatively moderate quality images of the specimen that can be used to detect defects on the specimen.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals.

FIG. 1 illustrates one embodiment of a system configured to inspect a specimen (i.e., a surface under observation) such as a semiconductor wafer. The system includes an illumination subsystem configured to illuminate specimen 10 by scanning a spot across the specimen. For instance, the illumination subsystem includes light source 12. Light source 12 may be a narrowband light source in one embodiment. The narrowband light source may include any appropriate narrowband light source known in the art such as a laser. The narrowband light source may be configured to generate light having one or more selected characteristics such as wavelength and polarization. Light from light source 12 may be directed to beam splitter 14. Light from light source 12 that passes through beam splitter 14 may be directed to one or more optical components that are configured to direct the light to the specimen. Beam splitter 14 may include any appropriate beam splitter known in the art.

In one embodiment, the illumination subsystem includes fiber 16 configured to direct light from light source 12 to objective 18. Fiber 16 may include any suitable fiber known in the art. Objective 18 may include any appropriate objective known in the art. In addition, although objective 18 is shown in FIG. 1 as including one refractive lens, it is to be understood that the objective may include more than one refractive lens or one or more reflective optical components.

In one such embodiment, objective 18 is configured to focus light from fiber 16 onto specimen 10. The end of fiber 16 through which the illumination exits the fiber creates a virtual aperture, and the dimensions (e.g., diameter) of the end of the fiber establish the spatial extent of the illuminated spot. In addition, the objective may be configured to control a size of the spot on the specimen. In one such embodiment, the fiber may have a relatively large diameter (e.g., about 1 mm or larger). Therefore, light exiting fiber 16 may have a diameter of about 1 mm or larger. In addition, the objective may be configured to control the size of the illuminated spot on the surface of specimen by reducing the diameter of the light beam that exited fiber 16. In this manner, the diameter of the illuminated spot on the surface of the specimen (e.g., about 20 μm) may be smaller than the diameter of the fiber. As such, the system may include a fiber optic that collects light from a light source (i.e., an illuminator), and the collected light exiting the fiber optic is directed to the surface of specimen 10 by objective 18 to control the size of the illuminated spot on the specimen. As such, the illuminated spot focused on specimen 10 may correspond to a demagnified image of the end of the fiber.

The spot focused onto the specimen by objective 18 may be scanned across the specimen by moving the specimen in one or more directions, as indicated by arrows 20. For example, the system may include a chuck (not shown) on which specimen 10 may be disposed during inspection. The chuck may include any suitable chuck known in the art. The chuck may be mounted on one or more stages (not shown) that are configured to translate the chuck and therefore the specimen disposed thereon in directions substantially perpendicularly to the surface normal. The stage(s) can be either x and y stages or a combination of radial and rotating stages. The stage(s) may include any suitable mechanical or robotic assembly known in the art.

Light specularly reflected from the spot scanned across specimen 10 may, in this embodiment, be collected by objective 18. Light collected by objective 18 may be collected and directed by fiber 16 to beam splitter 14. Beam splitter 14 may be configured to direct a substantial portion of the specularly reflected light to non-imaging detector 22. As such, in this embodiment, objective 18, fiber 16, beam splitter 14, and non-imaging detector 22 form a non-imaging detection subsystem of the system shown in FIG. 1. In this manner, the surface of specimen 10 reflects light that is collected by the objective and the fiber, a substantial portion of which is directed by the beam splitter onto the photosensitive surface of non-imaging detector 22. In some embodiments, the non-imaging detector may include a photomultiplier tube (PMT) or an avalanche photodiode (APD). Non-imaging detector 22 is configured to generate output signals responsive to light specularly reflected from the spot scanned across the specimen.

Output signals generated by the detector of the non-imaging detection subsystem may be provided to one or more electronic components coupled to the non-imaging detector. For example, analog-to-digital (A/D) converter 24 may be coupled to non-imaging detector 22. A/D converter 24 may be coupled to the non-imaging detector using any appropriate method or device known in the art. A/D converter 24 may also be coupled to processor 26 using any appropriate method or device known in the art. In this manner, processor 26 may receive the output signals generated by the non-imaging detection subsystem after the output signals have been processed by A/D converter 24.

Processor 26 is configured to generate images of specimen 10 using the output signals. For example, as the stage(s) move, the output signals of the non-imaging detector are sampled and digitized (by A/D converter 24). The digitized output signals may be stored to a storage medium (not shown) coupled to processor 26. Therefore, by sequential motion of the stage(s) and sampling of the non-imaging detector, a digital image of the surface of specimen 10 is acquired in the storage medium and may be assembled by processor 26.

Processor 26 is also configured to detect defects on the specimen using the images. Processor 26 may be configured to use any method and/or algorithm known in the art to detect defects on the specimen using the images. The defects that are detected by processor 26 may include any type of defects known in the art. Furthermore, the processor may be configured to perform any other defect related functions known in the art. Processor 26 may include any suitable processor known in the art.

Processor 26 may also be configured to control one or more components of the system shown in FIG. 1. For example, processor 26 may be coupled to the stages described above using any suitable method or device known in the art. In addition, processor 26 may be configured to control the stages to thereby control the scanning of the spot across the specimen.

The system shown in FIG. 1 has a number of advantages over other currently used bright field (BF) inspection systems. For instance, the system shown in FIG. 1 is configured to perform BF inspection of specimen 10 using a spot scanned across the specimen and non-imaging optics in a manner similar to that used in dark field (DF) spot scanning inspection systems. This optical configuration eliminates the coupling between the detector element periodicity and the detector sampling frequency required in other BF inspection systems. This decoupling eliminates one of the major limitations of macro defect inspection systems, which is the need to match the pixel size of the detector of the system to the numerical aperture (NA) of the objective. Thus, in a currently used BF inspection system configured to use a detector having a pixel size of 5 µm and, for example, 4×4 sampling of the detector requires a 20 µm equivalent point spread function, which is achieved by an imaging NA of 0.03. If the imaging NA of such a system was greater than 0.03, aliasing effects would be introduced into the images generated by the system. "Aliasing" generally refers to distortion of an image in which one or more features of a specimen do not appear in the image. Aliasing may occur when a lateral dimension and a position of the features in the image correspond to a pixel spacing of the detector.

In one embodiment, therefore, the non-imaging detection subsystem includes an objective (e.g., objective 18) and a detector (e.g., detector 22), and the NA of the objective advantageously does not match a pixel size of the detector. Since the systems described herein do not have to be configured such that the pixel size of the detector matches the NA of the objective (e.g., to eliminate aliasing), the necessity of using an objective having substantially limited NA, which results in inefficient light collection, is eliminated. Limitations on the NA of the system embodiments described herein are also reduced since the field of view of the system is substantially small, and since the system is configured essentially as a geometrical optical magnifying configuration, aberrations of the optical components of the system are irrelevant to performance of the system. In this manner, the systems described herein can have a larger imaging NA and thus more efficient light collection than currently used BF inspection systems. For example, in one embodiment, the non-imaging detection subsystem includes an objective (e.g., objective 18) having an NA of greater than about 0.05. Therefore, in some embodiments, the system includes an objective that has an NA of greater than about 0.05 that is not matched to a pixel size of the non-imaging detector. In addition, the NA of objective 18 may be equal to or greater than any reasonable value such as about 0.15, which can dramatically increase the light collection of the system beyond that achievable with an NA of 0.03 (e.g., an NA of about 0.15 corresponds to a light collection increase of about 25×).

In one embodiment, the system includes a non-imaging detector configured to detect the light collected by the objective and to generate amplified output signals responsive to the detected light. For instance, the optical configuration of the system shown in FIG. 1 advantageously allows the use of relatively high gain detectors such as PMTs and APDs. Such detectors may have a gain of about 50 or more. Using a relatively large NA as described further above in combination with a relatively high gain detector may increase the detection efficiency of the systems described herein by about 600× or more (depending on the shot noise limit) compared to the efficiency of currently used BF inspection systems.

The non-imaging detection subsystem of the system embodiments described herein may also be configured to include a non-imaging detector that has a relatively large dynamic range. The non-imaging detector may also be selected to be capable of single photon detection. Therefore, the non-imaging detection subsystems included in the embodiments described herein have a number of advantages over other currently used BF imaging detection subsystems. For instance, one example of an imaging detector commonly used in BF inspection systems is a charge coupled device (CCD). A CCD and other similar imaging detectors have a relatively small well capacity and baseline readout noise. As such, the systems described herein may have a higher signal-to-noise ratio, and therefore higher sensitivity, than currently used BF inspection systems.

The system embodiments described herein are configured to generate images of the surface of specimen 10 with moderate resolution (e.g., a resolution corresponding to a pixel size of about 5 µm to about 20 µm). In this manner, the systems may be particularly useful for macro/mezzo defect inspection applications. The system may also be configured to use the information acquired by inspection for defect detection and classification for a variety of specimens such as a patterned wafer and a non-patterned wafer. The non-patterned wafer may include a wafer having a film formed thereon (i.e., a "blanket" film formed thereon), a bare silicon wafer, or a wafer having a resist formed thereon. The film and the resist formed on the wafer may include any such materials known in the art.

The combination of the larger collection NA (without causing aliasing) and relatively large non-imaging detector gain that can be used in the system embodiments described herein is also advantageous since time delay integration (TDI) type detection is not relied upon to achieve adequate performance for at least macro/mezzo defect applications.

The system embodiments described herein are also advantageous since the burden of forming an image is transferred to the acquisition electronics (e.g., processor 26) instead of the optics of the system. Thus, the quality of the acquisition optics (e.g., objective 18) can be substantially reduced from that currently used in optical imaging based inspection systems thereby reducing the cost of the system embodiments described herein compared to other imaging systems. As such, the system embodiments described herein include a non-imaging optical configuration that is used to provide a system capable of acquiring images of a specimen using relatively inexpensive optics.

The objective may be selected based on the selected magnification of the spot on the surface of specimen 10. In addition, the system may be configured to alter a magnification of the light detected by the non-imaging detection subsystem, and therefore a magnification of the images generated by the processor using the output signals generated by the non-imaging detection subsystem, by altering the conjugate planes of the objective and the non-imaging detection subsystem. The system may be configured to alter the conjugate planes of the objective and the non-imaging detection subsystem using any method or device known in the art.

In some embodiments, the system shown in FIG. 1 is configured to alter a sampling frequency of the non-imaging detection subsystem to alter a magnification of the images generated by the processor of the system. For example, the system may be configured to control the sampling frequency of the non-imaging detection subsystem to alter the magnification of the light detected by the non-imaging subsystem and therefore the magnification of the images generated by the processor using the output signals. The system may be configured to alter and control the sampling frequency of the non-imaging detection subsystem in any manner known in the art. In this manner, the system shown in FIG. 1 may be configured to have variable magnification. In a further embodiment, the system is configured to select a sampling frequency of the non-imaging detection subsystem to substantially eliminate aliasing effects in the images. For instance, the sampling frequency of the non-imaging subsystem may be relatively high (e.g., 4 samples per optical spot) to substantially eliminate aliasing effects. The system shown in FIG. 1 may be further configured as described herein.

Figure 2:
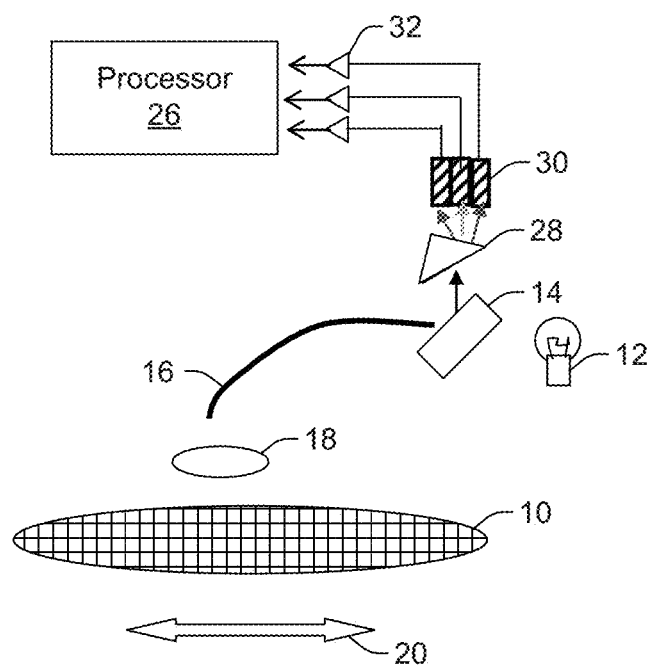

A different embodiment of a system configured to inspect a specimen is illustrated in FIG. 2. Elements shown in FIG. 2 that may be configured as described above with respect to FIG. 1 are not described further herein for the sake of brevity. In this embodiment, the illumination subsystem includes light source 12 that is a broadband light source. The broadband light source may include any suitable broadband light source known in the art. For example, the broadband light source may be a tungsten-halogen incandescent light source or an arc lamp. The broadband light source used in this embodiment may be selected to generate light with sufficiently high intensity such that additional information about the surface of the specimen may be obtained as described further herein. In this embodiment, the illumination subsystem also includes beam splitter 14, fiber 16, and objective 18, each of which may be configured as described above.

In this embodiment, light that is specularly reflected from the spot scanned across specimen 10 is collected by objective 18, collected by fiber 16, and directed by beam splitter 14 to dispersive optical component 28. Dispersive optical component 28 may be a prism, a grating, or any other suitable optical component known in the art that can be used to separate light having multiple wavelengths into spatially separated light beams having different wavelengths.

In the embodiment shown in FIG. 2, the non-imaging detector included in FIG. 1 is replaced with non-imaging detectors 30. In this manner, the detection subsystem of the system shown in FIG. 2 includes objective 18, fiber 16, beam splitter 14, dispersive optical component 28, and non-imaging detectors 30.

As shown in FIG. 2, the spectrally dispersive optical component may be inserted between the fiber that is used to collect the light specularly reflected from the spot scanned across the specimen and non-imaging detectors 30. In this manner, light having different wavelengths or wavebands may be directed to different non-imaging detectors. Each of the non-imaging detectors may be configured to generate output signals that are responsive to different wavelengths or wavebands of light specularly reflected from the spot scanned across the specimen. In this manner, the non-imaging detection subsystem is configured to simultaneously generate different output signals that are responsive to different wavelengths of the light specularly reflected from the spot scanned across the specimen.

Each of the non-imaging detectors may be coupled to one of A/D converters 32. The non-imaging detectors may be coupled to the A/D converters as described herein. In addition, each of A/D converters 32 shown in FIG. 2 is coupled to processor 26. In this manner, the output signals generated by the non-imaging detectors may be provided separately to the processor. As such, the system shown in FIG. 2 is configured for acquisition of measurements for multiple spectral bands simultaneously by using a broadband illumination source and a dispersive optical component to direct different wavelengths or wavebands of light to different non-imaging detectors of the detection subsystem.

Although the system of FIG. 2 is shown to include three different non-imaging detectors, each of which detects light specularly reflected from the spot scanned across the specimen at different wavelengths or wavebands, it is to be understood that the system shown in FIG. 2 may include two or more non-imaging detectors. In addition, the dispersive optical component may be configured to separate the specularly reflected light into two or more wavelengths or wavebands. In some embodiments, the number of different wavelengths or wavebands into which light is separated by the dispersive optical component may be equal to the number of non-imaging detectors included in the detection subsystem. In addition, the dispersive optical component may be configured to separate light specularly reflected from the spot scanned across the specimen into one or more near vacuum ultraviolet (near-VUV) wavelengths, one or more deep ultraviolet (DUV) wavelengths, one or more ultraviolet (UV) wavelengths, one or more visible wavelengths, or some combination thereof. The wavelengths or wavebands into which the light is dispersed may vary depending on, for example, the wavelengths of light used to illuminate the specimen, one or more characteristics of the specimen, one or more characteristics of defects of interest on the specimen, or some combination thereof.

The embodiment of the system shown in FIG. 2 has all of the advantages of the system of FIG. 1 described above in addition to further advantages over other currently used BF inspection systems. For instance, the system shown in FIG. 2 has a configuration that is suitable for automatic defect classification (ADC). In particular, the output signals generated for light specularly reflected from the spot scanned across the specimen at more than one wavelength or waveband may provide sufficient information such that ADC of defects detected on the specimen may be performed by the system. In one such embodiment, processor 26 is configured to perform ADC. In an additional embodiment, processor 26 is configured to determine if the defects detected on the specimen are nuisance defects. The processor may be configured to perform ADC and nuisance defect detection using any appropriate algorithm and/or method known in the art.

Monochromatic illumination and therefore monochromatic light collection can be problematic for BF inspection applications, particularly in the presence of process variations on the specimen. However, generating output signals for light specularly reflected from the spot scanned across the specimen at more than one wavelength or waveband as described herein desensitizes the inspection system to process variations that are inherent to semiconductor manufacturing processes. In one embodiment, therefore, an accuracy of the system shown in FIG. 2 is substantially independent of variations in the specimen caused by variations in a process performed on the specimen prior to inspection.

In addition, generating output signals for light specularly reflected from the spot scanned across the specimen at different wavelengths or wavebands allows the system to inspect specimens with different characteristics using wavelengths or wavebands that are appropriate for the different specimens. Therefore, for inspection of some specimens, output signals generated by fewer than all of the non-imaging detectors (i.e., for fewer than all of the detected wavelengths or wavebands) may be used for defect detection and other defect related functions.

Furthermore, as described herein, the embodiment of the system shown in FIG. 2 may include a non-imaging detector such as a PMT or APD. Therefore, the system shown in FIG. 2 utilizes broadband illumination and detection without using a TDI as a detector even for relatively small pixel sizes (e.g., pixels sizes of about 5 μm or smaller). The embodiment of the system shown in FIG. 2 may be further configured as described herein.

Figure 3:
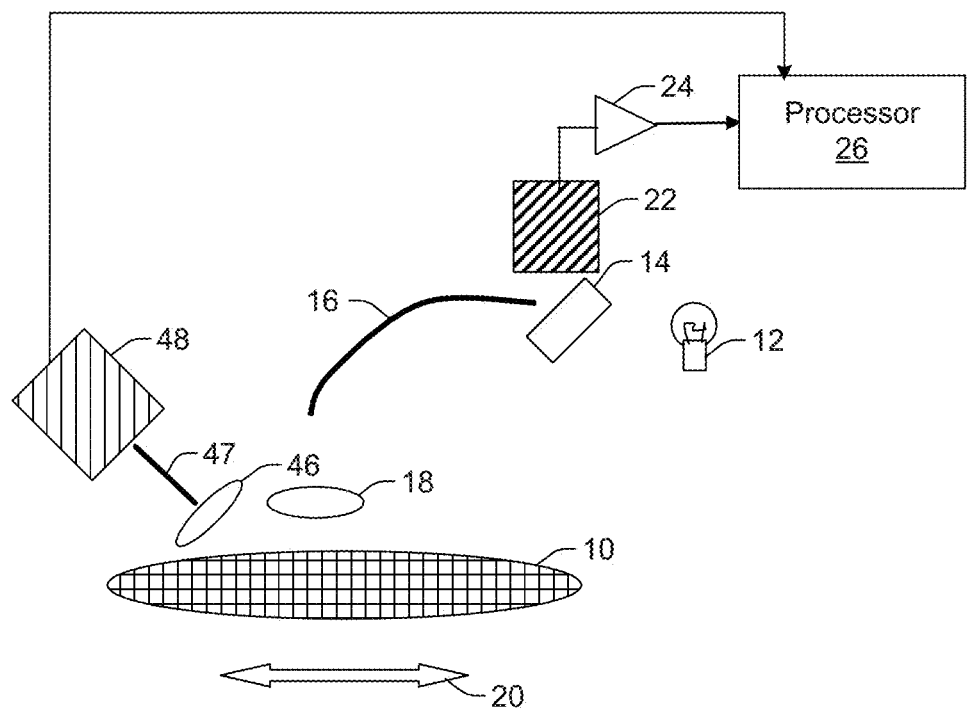

An additional embodiment of a system configured to inspect a specimen is illustrated in FIG. 3. Elements shown in FIG. 3 that may be configured as described above with respect to FIG. 1 are not described further herein for the sake of brevity. In the embodiment shown in FIG. 3, the system includes an additional non-imaging detection subsystem that is configured to generate additional output signals responsive to light scattered from the spot scanned across the specimen. In one such embodiment, processor 26 is configured to detect defects on specimen 10 using the additional output signals. In another embodiment, the non-imaging detection subsystem and the additional non-imaging detection subsystem are configured to generate output signals substantially simultaneously. In this manner, the system may be configured for BF signal collection simultaneously with DF signal collection. However, the system may be used to generate BF information only, DF information only, BF and DF information simultaneously, or BF and DF information sequentially.

As shown in FIG. 3, this embodiment of the system may include additional objective 46. Objective 46 is configured to collect light scattered from the spot scanned across the specimen. Objective 46 may include any appropriate optical component known in the art. In addition, although objective 46 is shown in FIG. 3 to be a single refractive lens, it is to be understood that the additional objective may include one or more refractive optical components or one or more reflective optical components. Objective 46 may have one or more characteristics that are the same as or different than objective 18.

Light collected by objective 46 is collected by fiber 47 that is configured to direct the light to additional non-imaging detector 48. Fiber 47 may include any of the fibers described herein. The additional non-imaging detection subsystem, therefore, includes objective 46, fiber 47, and non-imaging detector 48. The additional non-imaging detection subsystem also may or may not include fiber 47. In this manner, non-imaging detector 48 is configured to generate output signals responsive to light scattered from the spot scanned across the specimen. As such, the additional non-imaging detection subsystem is configured to generate DF signals. The output signals generated by the additional non-imaging detection subsystem may be sent to an A/D converter (not shown in FIG. 3) that may be configured as described herein.

The output of the A/D converter may be provided to processor 26. In this manner, processor 26 may be configured to generate an image of the specimen using output signals generated by non-imaging detector 48. Therefore, the processor may be configured to generate BF images and DF images of the specimen using the non-image output signals generated by the detection subsystems. In addition, the processor may be configured to use the DF information provided by non-imaging detector 48 alone or in combination with BF information provided by non-imaging detector 22 to detect defects on the specimen and to optionally perform one or more other defect related functions such as defect classification, nuisance defect identification, etc.

The DF information described above may be generated by collecting and detecting light scattered from the spot scanned across the specimen at any suitable collection angle. In addition, the angle at which the light scattered from the spot scanned across the specimen is collected and detected may be determined based on, for example, one or more characteristics of the illumination (e.g., angle of incidence, wavelength(s), polarization, etc.), one or more characteristics of the specimen, one or more characteristics of the defects of interest, or some combination thereof. In some embodiments, the system may be configured to alter the angle at which the scattered light is collected and detected, for example, by altering a position of objective 46, fiber 47, and non-imaging detector 48. The system may be configured to alter a position of objective 46, fiber 47, and non-imaging detector 48 in any manner known in the art.

In another embodiment, the system shown in FIG. 3 may include more than one non-imaging detection subsystem that are configured to detect light scattered at different angles from the spot scanned across the specimen. In this manner, the system may be configured to generate DF information at different scattering angles simultaneously. Each of the non-imaging DF detection subsystems may be coupled to a different objective or other light collecting optical component known in the art. The non-imaging DF detection subsystem or subsystems that are used for inspection of any particular specimen may be determined based on the collection angle(s) that may be selected as described above. The system shown in FIG. 3 has all of the advantages of the system shown in FIG. 1 described further above. The system shown in FIG. 3 may be further configured as described herein.

Although the systems shown in FIGS. 1-3 include fiber 16 that is configured to direct light from light source 12 to objective 18, it is to be understood that in another embodiment the fiber may be replaced with one or more other light directing optical components (not shown) such as one or more mirrors. In such embodiments, the illumination subsystem may also include an aperture (not shown) that is configured to control a size of the illumination spot directed to objective 18 and specimen 10. The aperture may include any appropriate aperture known in the art. In addition, the aperture included in the illumination subsystem may be a controllable or variable aperture. For instance, the aperture may be coupled to one or more devices (not shown) that are coupled to processor 26. The processor may be configured to control the one or more devices such that the one or more devices alter one or more dimensions of the aperture.

Although the systems shown in FIGS. 1-3 include fiber 16 configured for use in both the illumination subsystem and the non-imaging detection subsystem (i.e., for both illumination and pick up), the illumination can be delivered to the specimen in any other manner through objective 18. For instance, in a spot scanning system (and a multi-spot scanning system described further herein), the system performs imaging twice, once for imaging the spot or spots on the specimen for illumination, and once for imaging the illuminated spot(s) on the fiber (or fibers) for collection. In addition, imaging for illumination and imaging for detection are essentially independent of each other. Therefore, regardless of how the illumination is provided to the specimen, fiber 16 (or multiple fibers) is used for collecting and directing the light to the non-imaging detector or detectors. In this manner, the NA of illumination (e.g., the NA of objective 18) may be selected to be different from the NA of detection (e.g., the NA used for pick up).

The embodiments of the system shown in FIGS. 1-3 are, therefore, configured for narrowband inspection, broadband inspection, or BF and DF inspection. However, it is to be understood that the system may include various combinations of the above-described system configurations to increase the inspection capability of the system. For instance, the non-imaging DF detection subsystem shown in FIG. 3 may be included in any of the system embodiments shown in FIGS. 1-2. In this manner, two or more of the above described system configurations may be combined to provide one or more channels of information about the specularly reflected light possibly in combination with information about the scattered light. This additional information that can be generated by the system may improve the ability of the system (e.g., processor 26) to perform ADC and/or nuisance identification and rejection.

To increase the speed of inspection, a single fiber configured as described above may be replaced with an array of fibers in which individual fibers are sufficiently separated from each other (e.g., separated to sufficiently reduce cross talk between the fibers). In one such embodiment, the non-imaging detection subsystem includes two or more non-imaging detectors, instead of a single non-imaging detector. Each of the non-imaging detectors may be dedicated to a single fiber. In other words, each of the non-imaging detectors may be dedicated to generating output signals responsive to the light specularly reflected from one of the spots scanned across the specimen and collected by one of the multiple fibers.

Figure 4:
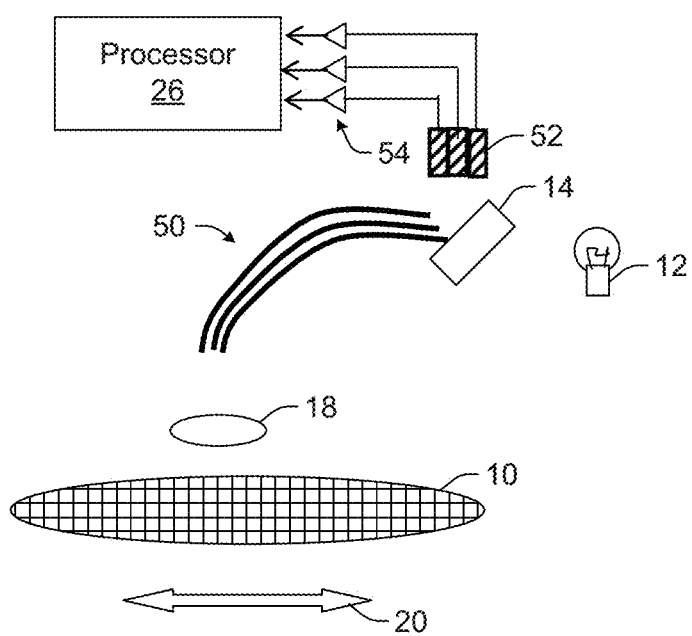

One embodiment of a system configured for relatively high speed inspection is shown in FIG. 4. In particular, the system shown in FIG. 4 is configured for relatively high speed data acquisition by parallelization of the system. Elements shown in FIG. 4 that may be configured as described above with respect to FIG. 1 are not described further herein for the sake of brevity. The illumination subsystem of the system shown in FIG. 4 is configured to illuminate the specimen by scanning multiple spots across the specimen simultaneously. For example, the illumination subsystem may include multiple fibers 50 that are configured to direct light from light source 12 (that passed through beam splitter 14) to objective 18. Although the system shown in FIG. 4 includes three fibers, it is to be understood that the system may include any appropriate number of fibers (i.e., two or more fibers). Each of the fibers may be similarly configured. In addition, each of the fibers may include any appropriate optical fiber known in the art.

In embodiments of the system that include one or more fibers used for illumination, the size of the spot or spots scanned across the specimen is limited by the relatively small effective NA of the fiber(s). The effect of the NA of the fiber(s) on the spot size may be mitigated by including microlenses coupled to (e.g., cemented to) the ends of the fiber(s). In addition, the effect that the fiber(s) have on the spot size may be further mitigated by reducing the working distances of the microlenses such that they are positioned in relatively close proximity to the surface of the specimen. The microlenses that are coupled to the fiber(s) may include any appropriate such lenses known in the art. Embodiments of the system that include such microlenses may or may not include objective 18.

Objective 18 is configured to focus the light from each of the multiple fibers onto specimen 10. In this manner, fibers 50 and objective 18 are configured to illuminate multiple spots on the specimen simultaneously. The multiple spots may be scanned across the specimen simultaneously as described above. The multiple spots may also be spatially separated from each other across the specimen.

Light specularly reflected from each of the spots scanned across the specimen may be collected by objective 18. Objective 18 may also be configured to direct light from each of the spots scanned across the specimen to different fibers 50. As such, each of the fibers collects light specularly reflected from a corresponding spot on the specimen. In this manner, specularly reflected light from each of the spots may be separately collected by the objective and the fibers and separately directed to beam splitter 14 by fibers 50. Beam splitter 14 is configured to direct a substantial portion of the light from each of the fibers to non-imaging detectors 52.

In this embodiment, the non-imaging detection subsystem includes objective 18, fibers 50, beam splitter 14, and non-imaging detectors 52. The number of non-imaging detectors included in the detection subsystem may be equal to the number of fibers 50 included in the system. In this manner, each of the non-imaging detectors may be dedicated to generating output signals responsive to the light collected by one of the fibers. Therefore, the light specularly reflected from different spots scanned across the specimen may be separately detected by the non-imaging detection subsystem. In one embodiment, therefore, the non-imaging detection subsystem is configured to simultaneously generate output signals responsive to light specularly reflected from the multiple spots scanned across the specimen. As such, the system shown in FIG. 4 is configured for multi-spot illumination of the specimen and multi-channel detection of light reflected from the specimen. Non-imaging detectors 52 may include any of the detectors described herein. In some embodiments of the system that include multiple fibers, one or more parameters of the non-imaging detectors such as gain and offset may be calibrated to account for differences in the optical transmission and light collection characteristics of the different fibers.

Each of the non-imaging detectors may be coupled to one of multiple A/D converters 54. A/D converters 54 may be configured as described herein. In this manner, output signals from each of the non-imaging detectors may be separately provided to processor 26, which may be configured as described herein. The system shown in FIG. 4 may be further configured as described herein.

The system shown in FIG. 4 has all of the advantages of the system of FIG. 1 described further above in addition to other advantages over currently used BF inspection systems. For instance, the image is formed by the system shown in FIG. 4 independent of the NA of the objective. Instead, the individual fibers act essentially like multiple spots, and the image can be generated pixel by pixel by the processor. Thus, the collection NA can be dramatically larger than that normally used in relatively large pixel BF inspection systems. In addition, the field of view of the system shown in FIG. 4 is substantially small compared to that of currently used BF imaging systems. In this manner, the system shown in FIG. 4 can be configured to include relatively inexpensive optical components. Furthermore, the output of each fiber can be detected using a non-imaging detector such as a PMT or an APD. These detectors have a relatively large gain thereby enhancing the sensitivity of the system. Moreover, the spot size of the system shown in FIG. 4 is determined by the image of the fiber aperture (or fiber exit) imaged on the specimen. In this manner, the system may be configured to have a continuously variable pixel size using different magnification ratios. The system shown in FIG. 4 also can advantageously be configured for simultaneous BF and DF inspection as described further herein.

Figure 5:
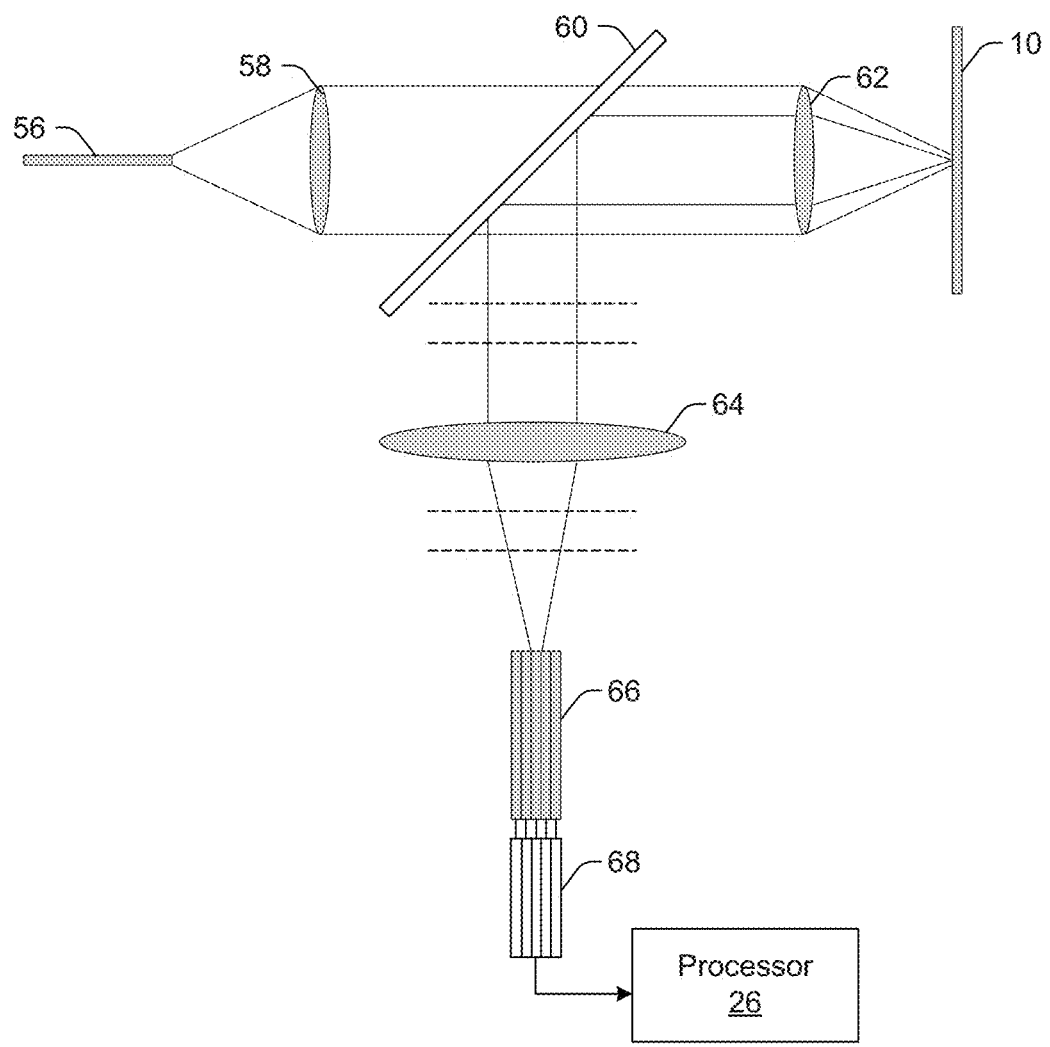

FIG. 5 illustrates a different embodiment of a system configured to inspect a specimen. The system shown in FIG. 5 is configured to illuminate a specimen by scanning a relatively large spot across the specimen and to detect light specularly reflected from different areas within the spot scanned across the specimen. The illumination subsystem of the system shown in FIG. 5 includes light source 56. Light source 56 may be an illumination rod or any other appropriate light source known in the art. In addition, light source 56 may be a narrowband light source or a broad band light source.

The illumination subsystem also includes optical component 58 and beam splitter 60. Light generated by light source 56 is directed by optical component 58 through beam splitter 60. Optical component 58 may include any appropriate optical component known in the art. In addition, although optical component 58 is shown in FIG. 5 to include one refractive lens, it is to be understood that optical component 58 may include one or more refractive lenses and/or one or more reflective optical components. Beam splitter 60 may include any appropriate beam splitter known in the art.

The illumination subsystem also includes objective 62. Objective 62 is configured to focus light that has passed through beam splitter 60 onto specimen 10. In some embodiments, objective 62 is configured to control a size of the spot on the specimen. Objective 62 may be further configured as described herein. The illumination subsystem of the embodiment shown in FIG. 5 is, therefore, different than the illumination subsystems of other system embodiments described herein in that the illumination subsystem shown in FIG. 5 does not include a fiber. In one embodiment, therefore, the illumination subsystem is configured to illuminate the specimen by flood illumination. In this manner, the size of the spot that is scanned across the specimen is not limited by the relatively small effective NA of a fiber. As such, the size of the spot that is scanned across the specimen by the illumination subsystem shown in FIG. 5 may be relatively large (e.g., about 1 mm or greater). The illumination subsystem of the system shown in FIG. 5 may be configured to scan the spot across the specimen as described herein.

The system shown in FIG. 5 also includes a non-imaging detection subsystem that is configured to generate output signals responsive to light specularly reflected from the spot scanned across the specimen. For instance, the non-imaging detection subsystem includes objective 62 and beam splitter 60. Objective 62 is configured to collect the light specularly reflected from the spot scanned across the specimen. Light collected by objective 62 is directed to beam splitter 60.

A substantial portion of the light collected by objective 62 is directed by beam splitter 60 to optical component 64 that is also included in the non-imaging detection subsystem. Optical component 64 is configured to focus the light from beam splitter 60 to array of fibers 66. Optical component 64 may include any appropriate optical component known in the art. In addition, although optical component 64 is shown in FIG. to include one refractive lens, it is to be understood that optical component 64 may include one or more refractive optical components and/or one or more reflective optical components.

Array of fibers 66 includes multiple fibers, each of which is configured to direct light to a dedicated non-imaging detector such as one of non-imaging detector array 68. In this manner, the system shown in FIG. 5 is configured for single spot illumination and multi-channel detection. The fibers and the non-imaging detectors may include any of the fibers and non-imaging detectors described herein. Furthermore, the non-imaging detection subsystem may include any appropriate number of fibers and non-imaging detectors. Alternatively, non-imaging detector array 68 may be replaced by a multi-channel non-imaging detector. For example, the non-imaging detector may include a multi-anode PMT or any other appropriate multi-channel non-imaging detector known in the art. The multi-channel non-imaging detector may include any appropriate number of channels known in the art.

As described above, the illumination subsystem shown in FIG. 5 is configured to illuminate the specimen by flood illumination. In this manner, in the system of FIG. 5, the specimen is flood illuminated, and the magnified image of the sample is projected onto an array of fibers, a two-dimensional array of non-imaging detectors, or a two-dimensional multi-channel array of a non-imaging detector. In one such embodiment, array of fibers 66 is configured to collect the light specularly reflected from different portions of the spot scanned across the specimen. In this manner, light specularly reflected from different areas within the spot scanned across the specimen may be separately detected. Each of the different areas has a size that is smaller than the size of the spot scanned across the specimen. In addition, the non-imaging detector array or the multi-channel non-imaging detector is configured to generate output signals responsive to light specularly reflected from different areas within the spot scanned across the specimen. The different areas within the spot scanned across the specimen from which specularly reflected light is detected may be spatially separated from each other.

As described above, the illumination subsystem of the system shown in FIG. 5 may include a broadband light source. In one such embodiment, each of the output signals generated by the non-imaging detection subsystem is responsive to multiple wavelengths of the light specularly reflected from the spot scanned across the specimen. In other words, the system may utilize broadband illumination, and the collected light may not be split into separate beams based on wavelength as described above with respect to the system shown in FIG. 2. In this case, all of the light across the broadband spectrum collected by each fiber is detected by a single detector dedicated to each fiber to provide a single output per fiber channel.

Each non-imaging detector or each channel of the multi-channel non-imaging detector may be coupled to a dedicated A/D converter (not shown in FIG. 5). The A/D converters may be configured as described herein. In addition, the A/D converters may be coupled to processor 26. In this manner, the output signals generated by the detector or detectors may be processed by the A/D converters and provided to processor 26. In this manner, processor 26 may separately receive output signals from each non-imaging detector or each channel of the multi-channel non-imaging detector. Processor 26 is configured to generate images of the specimen using the output signals. Processor 26 is also configured to detect defects on the specimen using the images. Processor 26 may be further configured as described herein. The system shown in FIG. 5 may be further configured as described herein. In addition, the system shown in FIG. 5 has all of the advantages of the systems shown in FIGS. 1 and 4 described above.

Figure 6:
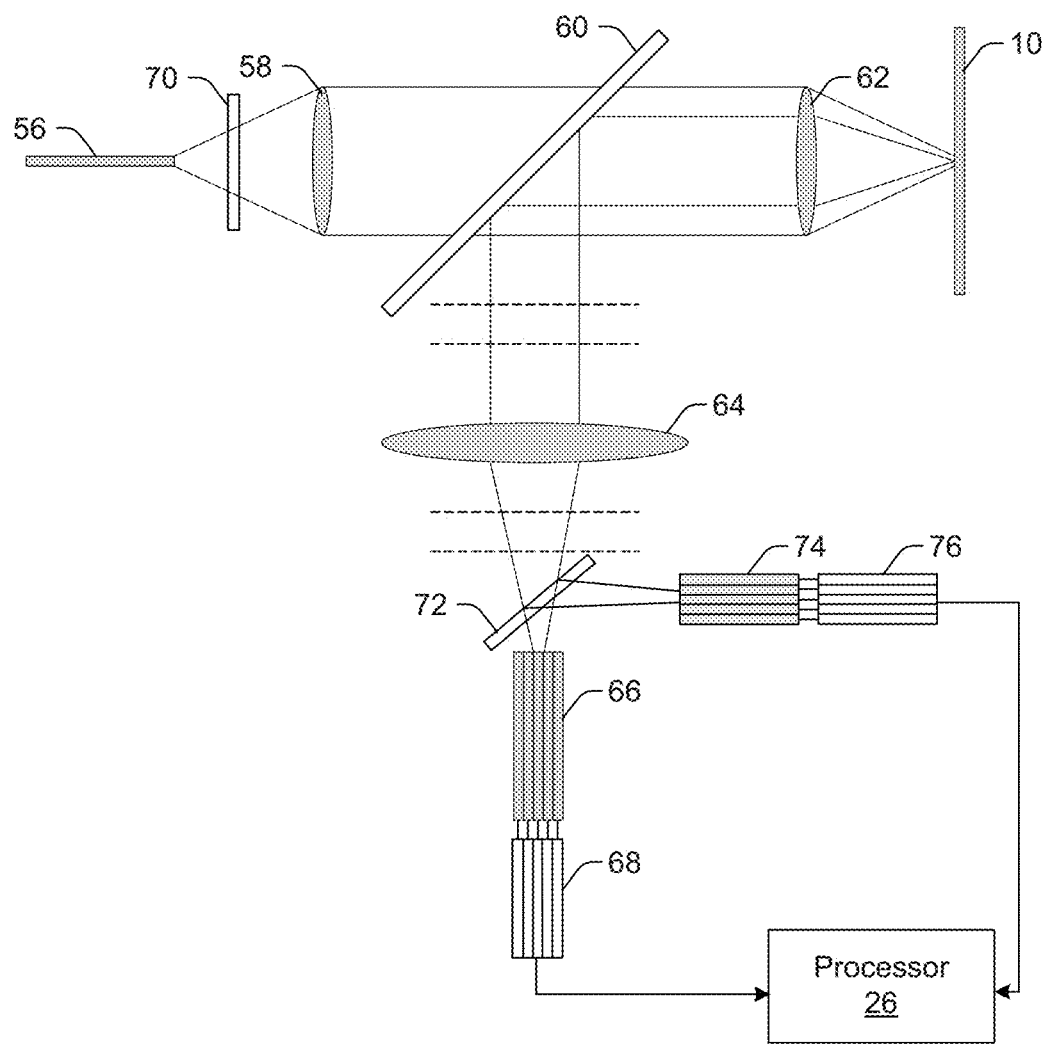

Another embodiment of a system configured to inspect a specimen is illustrated in FIG. 6. Elements shown in FIG. 6 that may be configured as described above with respect to FIG. 5 are not described further herein for the sake of brevity. In this embodiment, the system is configured to direct light having different polarizations into different detection channels to obtain additional information about the light specularly reflected from the spot scanned across specimen 10. This additional information may be utilized to perform ADC with higher accuracy.

In the embodiment shown in FIG. 6, light from light source 56 is directed to polarizer 70. Polarizer 70 may include any appropriate polarizing component known in the art. In addition, the polarizing component may be selected based on the polarization of light generated by light source 56 and the polarization selected for illumination of specimen 10. In some embodiments, the system may be configured to illuminate different specimens with light having different polarizations. For example, in one embodiment, the system may be configured to alter a position of polarizer 70 (e.g., by rotating polarizer 70) such that linearly polarized light having different orientations may be used for illumination. In another embodiment, the system may include more than one polarizer (not shown), each of which have one or more different characteristics. In this manner, the polarizer that is positioned in the optical path of the system may be selected based on the selected polarization for the illumination. In a similar manner, a polarizer may or may not be positioned in the optical path of the system depending on the polarization selected for illumination. The system may be configured to alter a position of polarizer 70 or to alter the polarizer disposed in the illumination path in any manner known in the art. In this manner, the system is configured to use polarized light for illumination and polarization specific information about the specimen for defect detection and possibly other functions such as defect classification.

Light that passes through polarizer 70 is directed by optical component 58 through beam splitter 60. Objective 62 focuses light that has passed through beam splitter 60 onto specimen 10. Objective 62 is also configured to collect the light specularly reflected from the spot scanned across the specimen. Light collected by objective 62 is directed to beam splitter 60. A substantial portion of the light collected by objective 62 is directed by beam splitter 60 to optical component 64. Optical component 64 is configured to focus the light from beam splitter 60 to optical component 72. Optical component 72 is configured to split the light from optical component 64 into light beams having different polarizations. Optical component 72 may be a polarizing beam splitter, a birefringent optical component, or any other suitable optical component known in the art.

In one embodiment, the system shown in FIG. 6 includes two non-imaging detection subsystems that are configured to generate output signals responsive to light specularly reflected from the spot scanned across the specimen. For example, light beams having different polarizations are produced by optical component 72 and directed to array of fibers 66 and array of fibers 74. Array of fibers 66 is coupled to non-imaging detector array 68 as described further above. In addition, array of fibers 74 is coupled to non-imaging detector array 76. Array of fibers 74 may be configured as described further above. Non-imaging detector array 76 may be configured as described above and may be replaced with a multi-channel non-imaging detector as described above.

The output signals generated by non-imaging detector arrays 68 and 76 are responsive to light having different polarizations. In this manner, the output signals generated by non-imaging detector arrays 68 and 76 contain information about the polarization of the light specularly reflected from the spot scanned across the specimen. The output signals generated by non-imaging detector arrays 68 and 70 may be processed by A/D converters (not shown) coupled to the arrays. The A/D converters may be configured as described herein. In this manner, output signals that contain information about the polarization of the light specularly reflected from the spot scanned across the specimen may be provided to processor 26. Processor 26 may use this information to detect defects on the specimen and optionally to perform one or more other functions such as classifying defects detected on the specimen. The embodiment of the system shown in FIG. 6 has all of the advantages of the systems described above. The system shown in FIG. 6 may be further configured as described herein.

Figure 7:
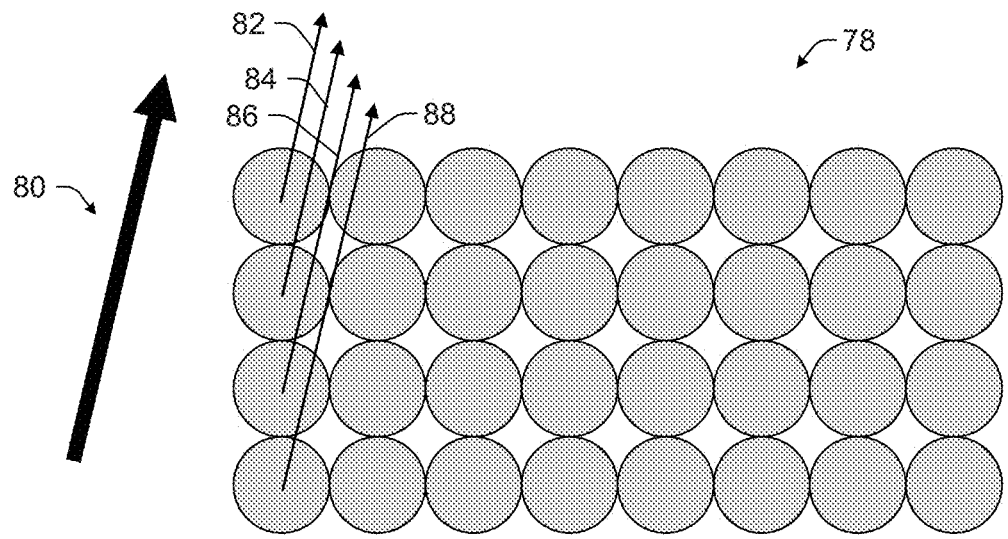
FIG. 7 is a schematic diagram illustrating a cross-sectional view of one embodiment of an array of fibers that may be included in the system embodiments described herein.

The systems shown in FIGS. 4-6 may include a non-imaging detection subsystem having a one-dimensional or two-dimensional configuration. For example, as shown in FIG. 7, one embodiment of array 78 of fibers that may be included in the system embodiments described herein is configured as a two-dimensional array of fibers. In systems that include such an array of fibers, the non-imaging detectors or channels (not shown in FIG. 7) may or may not be similarly arranged in an array. For instance, if the two-dimensional array of fibers is only used to collect the light specularly reflected from the specimen (as opposed to being used for both illumination and collection), the two-dimensional array of fibers may be arranged as shown in FIG. 7 proximate the end of the fibers in which the collected light enters the fibers. However, the other end of the fibers may be arranged in any suitable configuration depending on the degree to which the fibers can be manipulated along their lengths. In this manner, the array of fibers may have a configuration different than that shown in FIG. 7 proximate the end of the fibers that the collected light exits.

As shown in FIG. 7, the light specularly reflected from a specimen (not shown in FIG. 7) may be scanned across array 78 in the direction shown by arrow 80. As further shown in FIG. 7, the position of "tracks" 82, 84, 86, and 88 relative to the scan direction ensures proper sampling of the non-imaging detectors or the channels of the multi-channel non-imaging detector configured to detect light exiting array 78 in one direction. In the other direction (i.e., the scan direction), proper sampling may be ensured through time-domain sampling of the electronic signals generated by the non-imaging detectors or the channels of the multi-channel non-imaging detector. Although array 78 is shown in FIG. 7 as a 4×8 arrangement of fibers, it is to be understood that the array of fibers may include any appropriate number of fibers in both dimensions. In addition, the fibers included in array 78 may include any of the fibers described herein.

Figure 8:
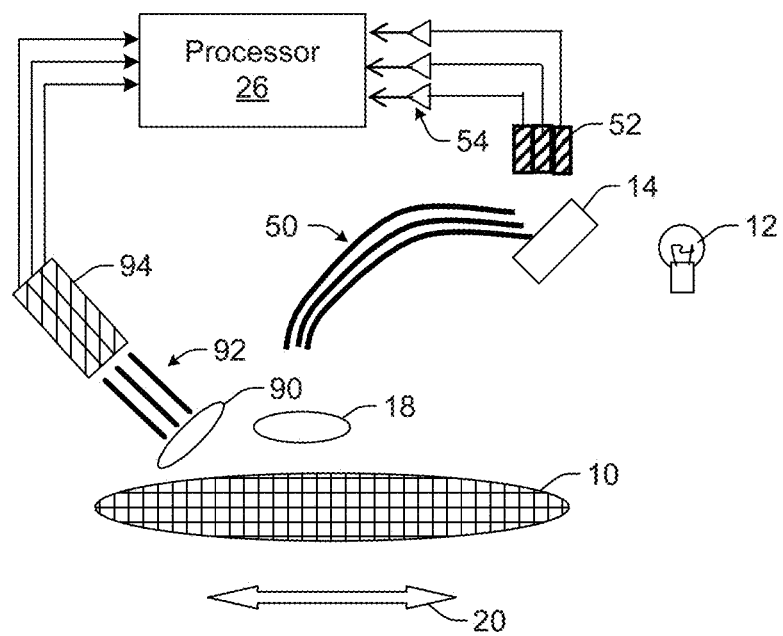
FIG. 8 is a schematic diagram illustrating a side view of an additional embodiment of a system configured to inspect a specimen.

The multi-spot BF systems shown in FIGS. 4-6 may also be configured as multi-spot DF systems. In this manner, the systems described herein may be configured to perform multi-spot BF and DF inspection in parallel. FIG. 8 illustrates one embodiment of a system configured to perform simultaneous BF and DF multi-spot data acquisition. Elements shown in FIGS. 4 and 8 that may be similarly configured will not be described further herein for the sake of brevity.

As shown in FIG. 8, the illumination subsystem is configured to illuminate the specimen by scanning multiple spots across the specimen simultaneously. The illumination subsystem may be further configured as described herein. In one embodiment, the system includes objective 90 that is configured to collect light scattered from the multiple spots scanned across the specimen. Objective 90 may be further configured as described herein. Objective 90 may be configured to direct the light scattered from the multiple spots scanned across the specimen to fibers 92. In this manner, light scattered from each of the multiple spots may be directed to a dedicated fiber. Fibers 92 may be further configured as described herein.

This embodiment of the system also includes additional non-imaging detectors 94 that are configured to simultaneously generate additional output signals responsive to light scattered from the multiple spots scanned across the specimen. In particular, additional non-imaging detectors 94 may be configured to generate output signals responsive to the light scattered from the multiple spots scanned across specimen 10 that is collected by objective 90 and fibers 92. Non-imaging detectors 94 may be further configured as described herein. The embodiment of the system shown in FIG. 8, therefore, includes an additional non-imaging detection subsystem that includes objective 90, fibers 92, and non-imaging detectors 94. In another embodiment, a multi-channel non-imaging detector may be used instead of non-imaging detectors 94.

In some embodiments, the DF non-imaging detection subsystem included in the system shown in FIG. 8 may be further configured as described in U.S. patent application Ser. No. 11/158,440 by Kadkly et al., now U.S. Pat. No. 7,345,752 issued on Mar. 18, 2008, and Ser. No. 11/158,441 by Kadkly et al., now U.S. Pat. No. 7,385,688 issued on Jun. 10, 2008, both of which were filed on Jun. 22, 2005 and are incorporated by reference as if fully set forth herein. In some embodiments, the system shown in FIG. 8 may include an additional illumination subsystem configured to provide illumination for the DF non-imaging multi-spot inspection. The additional illumination subsystem may be configured as described in the above referenced patent applications.

In one embodiment, the additional non-imaging detection subsystem is configured to generate output signals while the non-imaging detection subsystem is generating output signals. In this manner, the system shown in FIG. 8 may be configured and used for simultaneous multi-spot BF and DF inspection.

In some embodiments, non-imaging detectors 94 may be coupled to A/D converters (not shown in FIG. 8), each of which is dedicated to processing the output signals generated by one of the non-imaging detectors. In a similar manner, each of the A/D converters may be dedicated to processing the output signals generated by one of the channels of the non-imaging detector. The A/D converters may be further configured as described herein. The A/D converters may be configured to provide the processed output signals to processor 26. Processor 26 is configured to generate images of the specimen using the output signals. Processor 26 is also configured to detect defects on specimen 10 using these images. Processor 26 may be further configured as described herein.

Although the system shown in FIG. 8 includes different objectives for separately collecting light specularly reflected and scattered from the spots scanned across the specimen, it is to be understood that the system may include one objective (not shown) that is configured to collect both light specularly reflected and scattered from the spots scanned across the specimen. In this manner, the objective may be shared by the BF non-imaging detection subsystem and the DF non-imaging detection subsystem.

In one such embodiment, the BF non-imaging detection subsystem may include a notch filter that is configured to eliminate the illumination wavelength (e.g., the laser wavelength) from the light collected and detected by the BF non-imaging detection subsystem. In addition, the DF non-imaging detection subsystem may include one or more bandpass filters configured to eliminate wavelengths other than the illumination wavelength(s) from the light collected and detected by the DF non-imaging detection subsystem. The system shown in FIG. 8 may be further configured as described herein. In addition, the embodiment of the system shown in FIG. 8 has all of the advantages of the systems shown in FIGS. 1 and 4.

Figure 9:
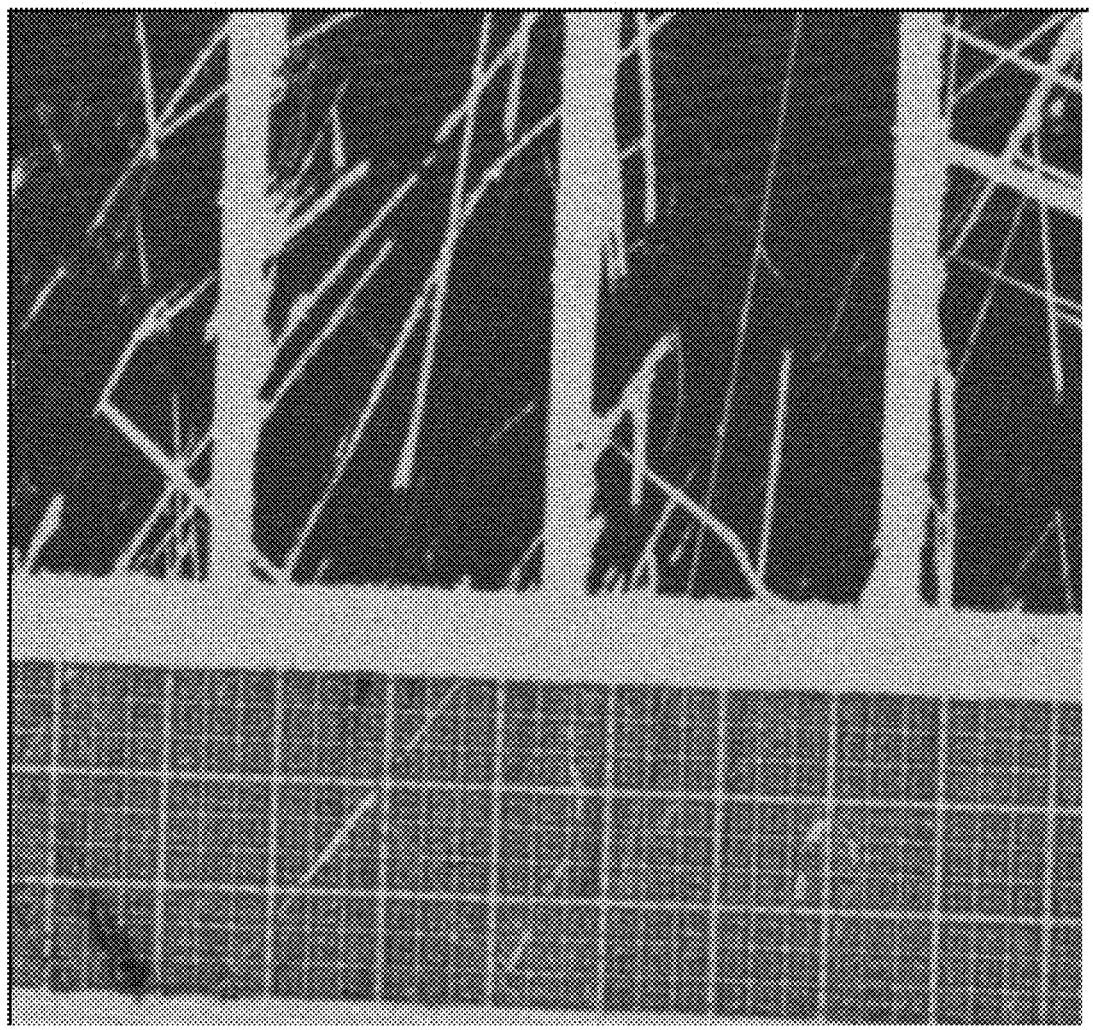
FIG. 9 is an example of an image of a specimen generated using a single fiber and white light illumination that demonstrates the operation of the system embodiments described herein.

FIG. 9 is an image of a specimen, which in this example is a patterned wafer, generated using a white light source to illuminate the specimen as described herein. Light from the white light source illuminated the specimen by scanning a spot on the specimen using a single fiber. Light specularly reflected from the specimen was directed from the specimen to a detector by the single fiber. The image was generated as described herein (e.g., from output signals generated by a non-imaging detection subsystem).

As shown in FIG. 9, the image is a relatively moderate quality image of the specimen formed at a resolution that is suitable for macro and/or mezzo defect inspection. As such, the image shown in FIG. 9 illustrates that the systems described herein can be used for inspection of a specimen as described further herein. Multiple optical fibers may be used to produce essentially this same image of the specimen through reconstruction of the output signals generated for the light exiting each multiple optical fiber. Such reconstruction may be performed by a processor that may be configured as described herein.

Additional embodiments relate to a method for inspecting a specimen. The method includes illuminating the specimen by scanning a spot across the specimen. Illuminating the specimen may be performed as described herein. The method also includes generating non-image output signals responsive to light specularly reflected from the spot scanned across the specimen. Generating the non-image output signals may be performed as described herein. In addition, the method includes generating images of the specimen using the non-image output signals. Generating the images may be performed as described herein. The method further includes detecting defects on the specimen using the images. Detecting the defects may be performed as described herein.

The method described above may be performed by any of the system embodiments described herein. In addition, the method described above may include any other step(s) described herein. For instance, in one embodiment, the method includes selecting a sampling frequency of a non-imaging detection subsystem used for generating the non-image output signals to substantially eliminate aliasing effects in the images.

In an additional embodiment, generating the non-image output signals includes simultaneously generating different non-image output signals that are responsive to different wavelengths of the light specularly reflected from the spot scanned across the specimen. In another embodiment, the method includes ADC of defects detected on the specimen. In some embodiments, an accuracy of the method is substantially independent of variations in the specimen caused by variations in a process performed on the specimen prior to inspecting the specimen. In a further embodiment, the method includes determining if the defects detected on the specimen are nuisance defects.

In some embodiments, illuminating the specimen includes illuminating the specimen by scanning multiple spots across the specimen simultaneously. In one such embodiment, generating the non-image output signals includes generating non-image output signals responsive to light specularly reflected from the multiple spots scanned across the specimen. In another such embodiment, the method includes generating additional non-image output signals responsive to light scattered from the multiple spots scanned across the specimen. Such a method may also include detecting defects on the specimen using the additional non-image output signals. In an additional embodiment, the method includes generating the non-image output signals and the additional non-image output signals substantially simultaneously.

In another embodiment, the method includes generating additional non-image output signals responsive to light scattered from the spot scanned across the specimen. In one such embodiment, the method includes detecting defects on the specimen using the additional non-image output signals. In another such embodiment, the method includes generating the non-image output signals and the additional non-image output signals substantially simultaneously.

In a further embodiment, the method includes generating additional non-image output signals responsive to light specularly reflected from the spot scanned across the specimen. The non-image output signals and the additional non-image output signals are responsive to light having different polarizations. In some embodiments, the specimen includes a patterned wafer or a non-patterned wafer. The non-patterned wafer may include a wafer having a film formed thereon, a bare silicon wafer, or a wafer having a resist formed thereon. Each of the embodiments of the method described above may include any other step(s) described herein. In addition, each of the embodiments of the method described above have advantages of the system embodiments described herein that may be used to perform the embodiments of the method.

The following description is material from U.S. patent application Ser. No. 11/158,440, now U.S. Pat. No. 7,345,752 issued on Mar. 18, 2008 to Kadkly et al., which was incorporated by reference as noted above. The only difference between the material below and the corresponding material in the above-referenced patent is that the figure numbers and the reference numerals have been changed to eliminate conflicts with other figures and reference numerals described herein.

Figure 10:
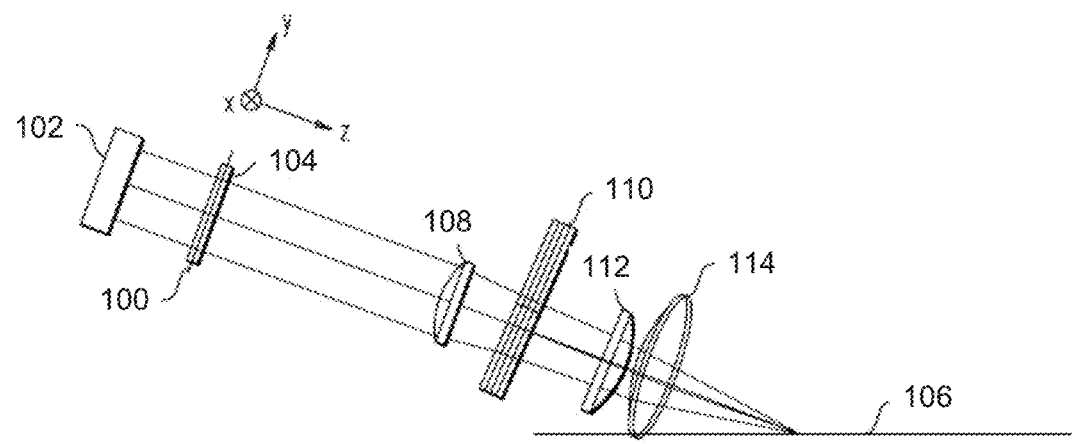
FIG. 10 is a schematic diagram illustrating a cross-sectional view of one embodiment of a system configured to provide illumination of a wafer for inspection.

FIG. 10 illustrates one embodiment of a system configured to provide illumination of a wafer for inspection. The system includes one or more optical elements configured to direct light to entrance pupil 100. The one or more optical elements include at least one light source (not shown). One example of an appropriate light source is a laser that is configured to emit light at an ultraviolet (UV) wavelength of about 355 nm. However, the light source may include any other appropriate light source known in the art. In addition, the one or more optical elements may include more than one light source (not shown). The light sources may be configured to emit light having different properties such as wavelength.

The one or more optical elements may also include optical element(s) (not shown) that are configured to alter the properties of the light directed to the entrance pupil. For example, the optical element(s) may include one or more polarizers, one or more filters, and beam shaping element(s). In addition, the one or more optical elements may include one or more light directing elements. For example, as shown in FIG. 1, the one or more optical components may include refractive element 102. Refractive element 102 may be, for example, a collimating lens or a beam expanding/collimating lens. The light directing elements may also or alternatively include reflective elements.

The system also includes diffractive optical element (DOE) 104 positioned at entrance pupil 100. DOE 104 may be positioned in the plane of entrance pupil 100. In addition, DOE 104 may be substantially centered with respect to the entrance pupil plane and rotated at a specified angle. DOE 104 is configured to separate the light directed to the entrance pupil into individual beams. The DOE may also be configured as a high efficiency DOE. In other words, the efficiency of the DOE may be from about 65% to about 75%. The DOE may be further configured to generate individual beams having approximately equal intensity. The substantially uniform intensity of the individual beams may be attributable to the relatively high efficiency of the DOE. If the light directed to the DOE is substantially collimated, each of the individual beams generated by the DOE is also substantially collimated.

The DOE is configured to separate the light into at least three individual beams. In one embodiment, the DOE may be configured to generate 19 substantially collimated individual beams of light. In general, a large number of individual beams may be desirable since the number of individual beams determines the number of spatially separated spots that can be formed on the wafer plane. However, when selecting the number of individual beams, it is important to take into consideration the fact that as the number of individual beams into which the light is separated increases, the complexity of the optical system also increases. In addition, the DOE may be a diffraction grating that is configured to generate a two-dimensional array of individual beams (instead of a one-dimensional array of individual beams as is usually the case) in which case the DOE may not be rotated with respect to the pupil's z-axis. Diffraction gratings configured to generate a two-dimensional array of individual beams are commercially available from, for example, Heptagon, Espoo, Finland.

The individual beams generated by the DOE are directed to a set of optical elements. The set of optical elements includes lenses that have both spherical and aspheric surfaces. The set of optical elements is located a distance away from the DOE. The set of optical elements is configured to focus the individual beams to wafer plane 106 to form spatially separated spots (not shown in FIG. 10) on wafer plane 106. As shown in FIG. 10, wafer plane 106 is arranged at an oblique angle to the entrance pupil. In one embodiment, the oblique angle may be about 70 degrees. However, the oblique angle may vary depending on, for example, the configuration of the illumination system, the configuration of an inspection system in which the illumination system is used, and/or characteristics of the wafer to be inspected.

Since the DOE is used to generate the individual beams that are focused to the wafer plane, each of the spots formed on the wafer plane may be diffraction limited. In this manner, the illumination system advantageously has diffraction limited performance. In addition, each of the spots may have a Gaussian profile. In particular, the spots may have Gaussian profiles if the light provided by the light source has a Gaussian profile. In other words, the intensity profiles of the spots formed on the wafer plane may vary depending on the intensity profile of the light directed to the entrance pupil.

Each of the spots formed on the wafer plane may also have an elliptical shape since the wafer plane is arranged at an oblique angle with respect to the entrance pupil. The elliptically shaped spots may have a major axis to minor axis ratio of about 3:1. The major axis to minor axis ratio is a function of the angle of incidence. Therefore, if the angle of incidence changes, the major axis to minor axis ratio of the spots formed on the wafer plane will also change.

In addition, the size of each of the spots may be approximately equal. Examples of appropriate sizes for the spots formed on the wafer plane include 3 microns×9 microns and 5 microns×15 microns. The size of the spots may vary depending on a number of parameters of the system such as the size of the limiting aperture, which determines the size of the light beam at the entrance pupil, and the configuration of the DOE. In addition, as the size of the spots formed on the wafer plane decreases, the complexity of the optical system may increase, for example, to further compensate for any aberrations that may be more pronounced for smaller spot sizes. If on the other hand the size of the illuminating beam is fixed, the spot size can still be changed by changing the effective focal length (EFL) of the optical system. The spot size can further be changed by changing the wavelength of the illuminating light source. In general and for a rotationally symmetric system, the above parameters are related by the simple formula: $D_0=4*\lambda*(EFL)/(\pi*B)$, where $D_0$ is the focused Gaussian beam diameter, $\lambda$ is the illuminating wavelength, and B is the waist diameter of the incoming collimated laser beam at the pupil. Whilst the spot size in the x direction of FIG. 11 is approximately determined from the above formula, the size of the spot in the y direction is "stretched" by a factor proportional to the inverse of the cosine of the wafer's tilt angle with respect to the pupil of the lens.

The size of the spots may also be selected such that a substantial amount of light scattered from the spots is not light scattered from a surface of the wafer. In particular, since the size of each of the spots is much smaller (e.g., about 20 times smaller) than the size of a single spot or line on a wafer plane, the spots are closer in size to the defects on the wafer than a single spot or line. In this manner, during illumination of a defect on the wafer by one of the spatially separated spots, a larger portion of the spatially separated spot will be incident on the defect than that of the single spot or line. In other words, a much smaller area of the surface of the wafer will be illuminated by each of the spatially separated spots compared to the single spot or line.

Such limited illumination of the wafer surface by each of the multiple spots necessarily causes less scattering of light from the wafer surface within each of the spots on the wafer plane. By reducing the amount of light scattered from the wafer surface, the illumination systems described herein may be used in an inspection system to increase the signal-to-noise ratio (SNR) of the inspection system. Such reduction in the scattering of light from a rough surface on a wafer is particularly important since the amount of light scattered from a rough wafer surface may be relatively high with respect to the amount of light scattered from defects on the wafer, and particularly relatively small defects. Therefore, the illumination systems described herein may be used in inspection systems not only to increase the absolute defect sensitivity of the inspection system but also to increase the sensitivity of the system for defect detection on relatively rough surfaces. As such, the inspection system embodiments described herein will have a higher SNR than a single large spot or line imaging based system by virtue of the smaller wafer area illuminated by each of the multiple spots that provides substantially enhanced rejection of background surface scattering (e.g., due to roughness).

Figure 11:
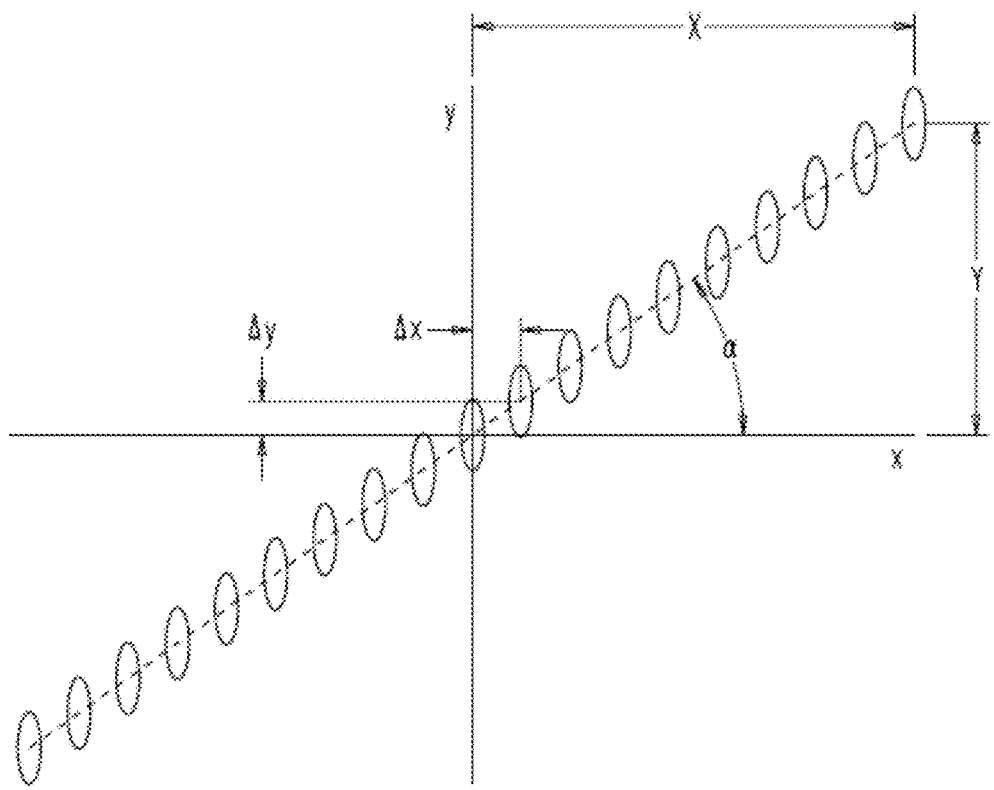
FIG. 11 is a schematic diagram illustrating a top view of one embodiment of spatially separated spots formed on a wafer plane.

As shown in FIG. 11, the spots formed on the wafer plane may be arranged along a line inclined by α degrees relative to the local x and y axes of the wafer plane. The angle of this line with respect to the local x and y axes may vary depending on the rotation of the illumination system with respect to the entrance pupil plane. For example, the DOE or the set of the optical elements may be rotated about a z axis of the plane of the entrance pupil. The angle of rotation of the DOE or the set of optical elements will determine the angle of the line with respect to the local x and y axes of the wafer plane. Alternatively, the angle of rotation may vary depending on the configuration of the DOE when a two-dimensional DOE is used in the system.

The x and y coordinates of the individual spots on the wafer plane are determined by the pitch of the DOE and the focal length of the illumination optics. Since it is preferable that the spots do not overlap on the wafer plane, the separation between the spots may be relatively large. In particular, the period (or pitch) of the grating can be determined from the following formula: P=wavelength/sin(diffraction angle of the first order). The separation of the spots may be defined by the distance between the centers of adjacent spots. For example, as shown in FIG. 11, the separation may be defined in the x direction as $\Delta x$, and the separation may be defined in the y direction as $\Delta y$. In one example, $\Delta x$ may be about 6.4 microns, and $\Delta y$ may be about 4.5 microns. For such separation and an illumination wavelength of 355 nm, the DOE may have a pitch of about 2.4 mm. In some applications it may be advantageous to have a greater separation between any two adjacent spots on the wafer. For example, greater separation would allow for a greater immunity to any potential cross talk that may occur at the detection plane. For example, it may be advantageous to have a separation, $\Delta x$, of 12.8 microns, and $\Delta y$ may still remain at about 4.5 microns. The DOE pitch can be chosen to satisfy any desired spot separation.

As shown in FIG. 11, the spots extend from the center spot across a lateral dimension, X, along the x axis equal to about ((the total number of spots−1)/2)×$\Delta x$. In one example, therefore, for 19 total spots and a $\Delta x$ of about 6.4 microns, X may be equal to about 57.6 microns (9×about 6.4 microns). In addition, the spots extend from the center spot across a lateral dimension, Y, along the y axis, which may be determined as described above. For example, Y may be equal to about 40.5 microns based on the examples provided above. Therefore, the spots may be located within an area of the wafer plane of about 2× times about 2Y.

The spots are formed on the wafer plane simultaneously as described herein. Therefore, during scanning of the spots over the wafer plane, each of the spots will scan across the wafer plane simultaneously. Scanning of the spots over the wafer plane may be performed in any manner known in the art (e.g., by translation and/or rotation of the wafer while the optics are stationary, by a stationary wafer position with translating or scanning optics, or a combination thereof). For the arrangement of the spot shown in FIG. 11, the spots may be scanned over the wafer plane in a direction approximately parallel to the x axis. In this manner, as the spots scan along this direction, a portion of an area on the wafer plane that was scanned by one spot will also be scanned by another "trailing" spot. As such, a portion of the wafer plane may be scanned by different spots sequentially. In other words, the scan paths of adjacent spots will partially overlap in a direction along the y axis.

As such, an entire lateral dimension of the area on the wafer plane in which the spots are located (e.g., about 2Y for scanning along the x axis) is illuminated by the spatially separated spots as the spots are scanned across the wafer plane. In this manner, although the spots themselves have relatively small sizes, the width of a swath (i.e., the width of the scan path) on the wafer may be relatively large (e.g., about 81 microns). Therefore, the throughput of an inspection system that includes an illumination system embodiment described herein may be approximately equal to or greater than the throughput of single spot or line imaging based inspection systems. Accordingly, the systems described herein provide instantaneous multi-spot scanning with the same or increased speed compared to currently used systems. In addition, although discrete, spatially separated spots are imaged on the wafer, scanning can be performed without "missing" any areas on the wafer within the scan path.

Referring back to FIG. 10, the set of optical elements may include optical element 108. Optical element 108 is a refractive optical element that is centered with respect to the x and y axes of the plane of the entrance pupil. The orientation of the x, y, and z axes of the plane of the entrance pupil are shown in FIG. 10. Optical element 108 has one spherical surface and one aspheric surface. Optical element 108 is also not tilted with respect to the entrance pupil plane. Optical element 108 may be used as a reference element. In other words, other optical elements of the set described further herein may be positioned with reference to optical element 108. Optical element 108 may also be designed such that this optical element does not substantially impact the performance of the system either negatively or positively.

In one embodiment, the set of optical elements also includes two optical elements 110 and 112 that are decentered with respect to the x and y axes of the plane of the entrance pupil. These two optical elements are also tilted with respect to the y axis. Decentering and tilting optical elements 110 and 112 as described above reduces the aberrations in the spatially separated spots formed on the wafer plane, which are described further herein. In this manner, decentering and tilting these optical components improves the performance of the illumination system and the performance of an inspection system in which the illumination system is used. In addition, as shown in FIG. 10, optical elements 110 and 112 have one spherical surface and one aspheric surface. (Although it is not shown in FIG. 10 due to the scale of the figure, optical element 110 may be a planar concave lens or a negative curvature lens.) Optical elements 110 and 112 are also refractive elements.

In another embodiment, the set of optical elements also includes a third optical element 114. The third optical element is decentered with respect the x and y axes of the plane of the entrance pupil. In addition, the third optical element is tilted with respect to the x axis of the plane of the entrance pupil. Decentering and tilting optical element 114 also reduces the aberrations in the spatially separated spots formed on the wafer plane as described further herein. As such, decentering and tilting optical component 114 also improves the performance of the illumination system and the performance of an inspection system in which the illumination system is used. As shown in FIG. 10, optical element 114 has one spherical surface and one aspheric surface. In addition, optical element 114 is a refractive optical element. Therefore, in one embodiment, all of the optical elements of the set (e.g., optical elements 108, 110, 112, and 114) are refractive optical elements. The optical elements may be formed of any suitable refractive material known in the art that has adequate transmission properties at the chosen wavelength of operation.

Figure 10A:
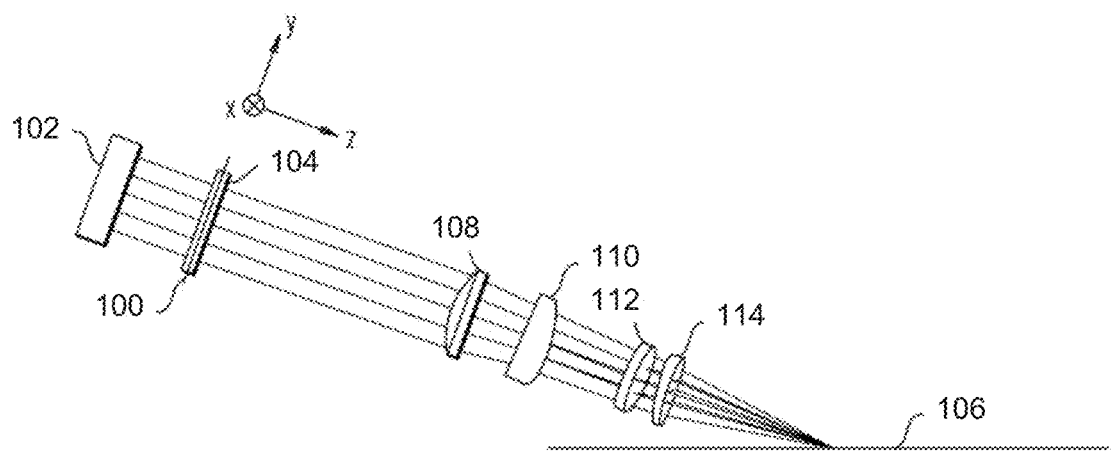
FIG. 10*a* is a schematic diagram illustrating a cross-sectional view of one embodiment of a system configured to provide illumination of a wafer for inspection that includes one or more truncated optical elements.

In some embodiments, the set of optical elements includes one or more truncated optical elements. For example, in one such embodiment, all of the lenses of the set, except for the first optical element (i.e., optical element 108) may be truncated in order to fit the set of optical elements into a compact mechanical housing that will provide adequate clearance between the last element (i.e., optical element 114) and the wafer plane. A clearance of a few millimeters (e.g., about 5 mm to about 6 mm) is typically adequate to facilitate easy assembly, removal, and servicing. Extending the clearance beyond that reported here results in a system that is either substantially complex and/or less well corrected thereby failing to meet the diffraction limited performance and less than perfect Gaussian shaped focused spots which are desirable for this application. Truncation of the lenses is possible due to the asymmetry of the optical system. In other words, active image forming rays do not fill the entire surface of each lens. A truncated (profiled) embodiment of the system is shown in FIG. 10*a*. The system shown in FIG. 10*a* may be configured as described further herein.

Defocus and astigmatism are typically the most important aberrations contributing to degradation of image quality in optical systems with tilted image planes. These aberrations are not a major issue if the system generates a single spot or line coincident with the tilt line (axis) as is currently performed. But when a system is configured to generate multiple spots on a wafer plane that is tilted with respect to the optical axis (e.g., as shown in FIG. 10) and with a spot distribution such as that shown in FIG. 11, the effect of these aberrations on the system performance becomes a serious issue if not corrected.

In particular, with the exception of the central spot, all other spots will be out of focus, and the focus error will increase with increasing field size (i.e., increasing number of spots) and tilt of the image plane. This defocus error also has opposite values at opposite ends of the field. In other words, the spots across the field will be in focus along a line that is perpendicular to the optical axis of the illumination system. However, this line is not parallel to the tilted wafer plane. As such, the spots at the extreme edges of the field will come into focus at different heights with respect to the wafer plane: at one edge below the wafer plane, and at the opposite edge above the wafer plane. Such defocus error is shown by way of example in FIG. 12, which includes simulated plots illustrating ray aberrations of multi-spot illumination optics that include centered spherical, aspheric, and cylindrical optical elements across the field on an inclined wafer plane. The plots were simulated for an illumination wavelength of 355 nm and an oblique angle at which the wafer plane is arranged with respect to the entrance pupil plane of 70 degrees.

Figure 12:
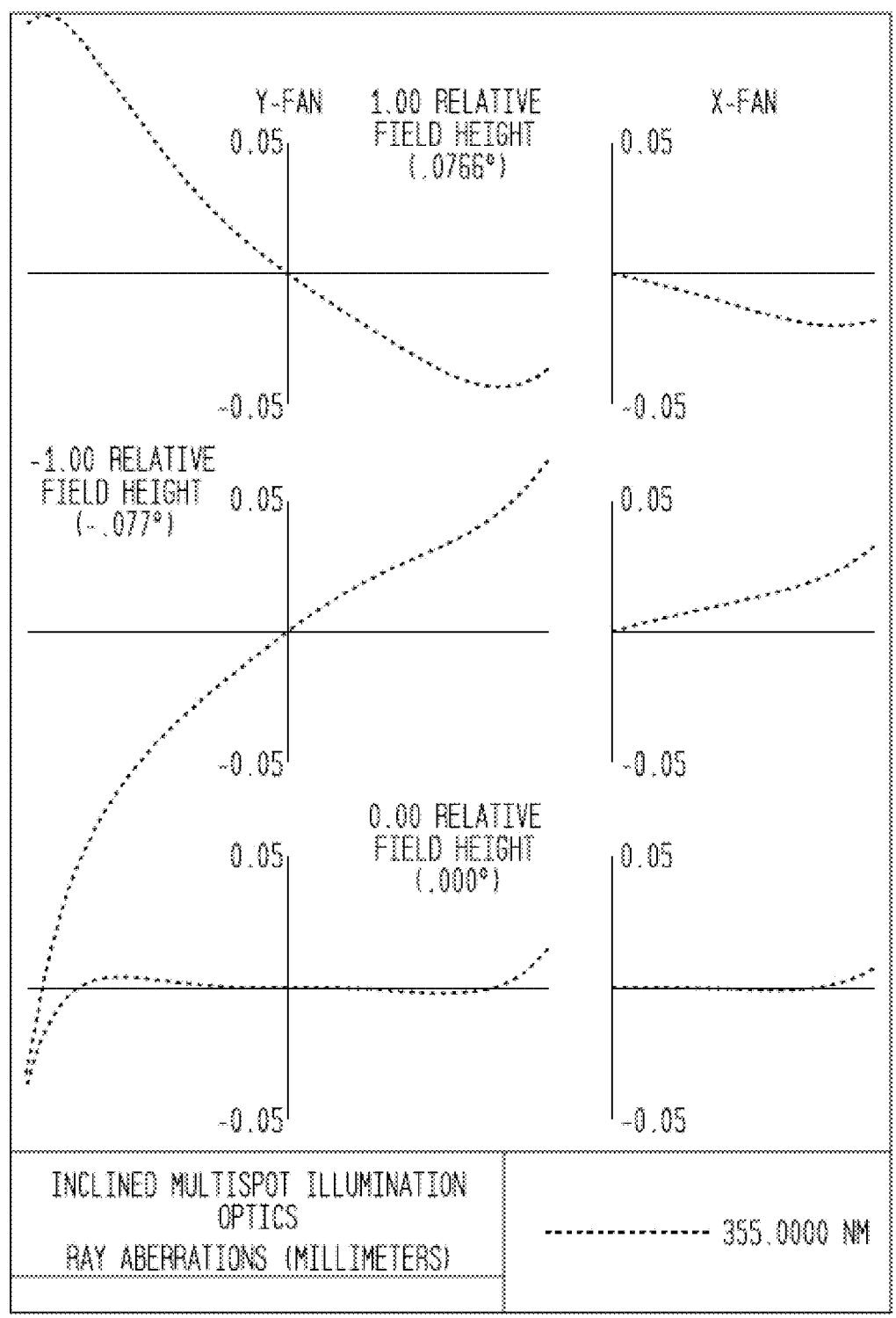
FIG. 12 includes simulated plots illustrating ray aberrations of multi-spot illumination optics that include centered spherical, aspheric, and cylindrical optical elements across the field on an inclined wafer plane.

The simulated plots on the left hand side of FIG. 12 illustrate the ray aberrations (in mm) across the field along the y axis of the pupil. The simulated plots on the right hand side of FIG. 12 illustrate the ray aberrations across one half of the field along the x axis of the pupil. From top to bottom, the plots are simulated for 1.00 relative field height, −1.00 relative field height, and 0.00 relative field height.

As shown in the plots for the positive field height along the x and y axes, the ray aberrations along the y axis change much more dramatically across the field than the ray aberrations along the x axis. Such differences in the ray aberrations along the x and y axes are also seen in the plots for negative defocus. In this manner, the focus error along the y axis will be much greater across the field than the focus error along the x axis. In addition, as shown by the ray aberrations along the y axis for the positive field height, the negative field height, and the axial field height, the ray aberrations have opposite values at opposite ends of the field. Furthermore, as shown by comparison of the ray aberrations along the x and y axes for the positive and negative field heights, as the field height switches from positive to negative, the ray aberration values at different ends of the field also switch from positive to negative or vice versa. As such, defocus of the optics in one direction will only further compromise the performance of the optics in the opposite direction. Therefore, centered optical systems incorporating spherical, aspheric, and cylindrical elements will not be able to correct for this type of asymmetric focus error.

The set of optical elements described herein is, however, configured to correct asymmetric focus error in the spots across the field in the illumination system. In particular, the embodiments of the set of optical elements described herein include aspheric optical elements, centered and decentered, some of which are tilted relative to the optical axis. In general, a minimum of two lenses, tilted in the two directions can be used. However, in embodiments described herein to keep the mechanical assembly relatively simple, three tilted/decentered elements are used: two tilted/decentered with respect to the y axis of the entrance pupil and a third tilted/decentered in a plane perpendicular to that of the other two lenses (i.e., tilted/decentered with respect to the x axis of the entrance pupil). The two optical elements that are decentered and tilted with respect to the y axis of the plane of the entrance pupil are used to correct the aberrations along the y axis, and the third optical element that is decentered and tilted with respect to the x axis is used to correct the aberrations along the x axis. Two optical elements are used to correct the aberrations along the y axis (while a single optical element can be used to correct the aberrations along the x axis) since the aberrations along the y axis are relatively severe. As such, using two optical elements for correction of the aberrations along the y axis substantially reduces the complexity of the system while achieving substantial correction of the aberrations.

All of these elements are aspheric and, except for the reference optical element, are decentered to some extent. In addition, the curvature of the lenses included in the set of optical elements (except for possibly the reference optical element) can be selected to substantially correct any astigmatism caused by the tilting and decentering of the optical elements. In this manner, the use of aspheric elements helps to compensate for the higher order aberrations introduced by the tilting/decentering of the optical elements as well as keeping the number of optical elements to the minimum possible while providing diffraction limited performance with adequate clearance between the optics and the wafer plane.

Figure 13:
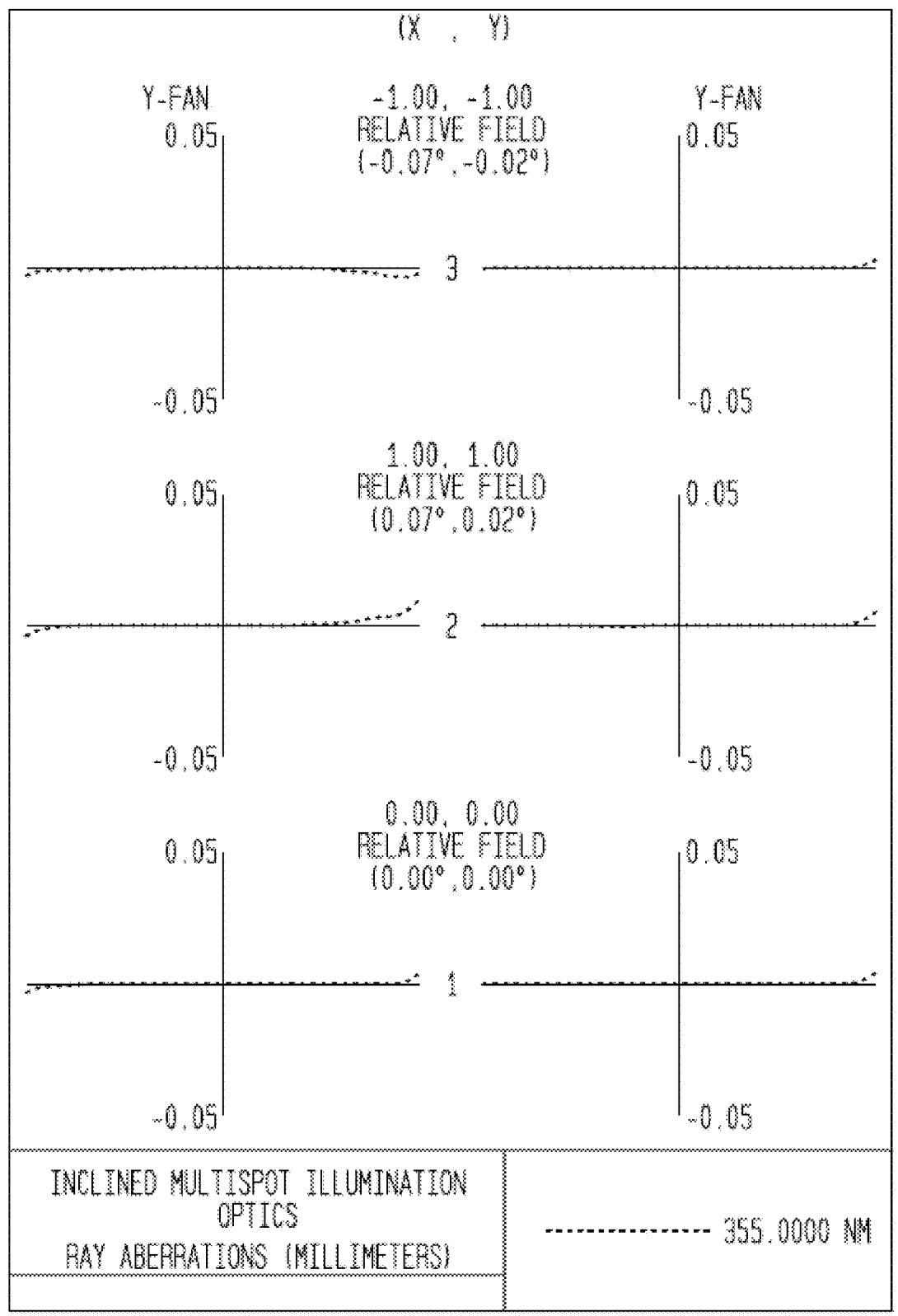
FIG. 13 includes simulated plots illustrating ray aberrations of multi-spot illumination optics configured according to embodiments described herein across the field on an inclined wafer plane.

The substantial correction of the asymmetric focus error in the spots formed on the wafer plane is illustrated by way of example in FIG. 13, which includes simulated plots illustrating ray aberrations of multi-spot illumination optics configured according to embodiments described herein across the field on an inclined wafer plane. The plots shown in FIG. 13 were simulated for an illumination wavelength of 355 nm and an oblique angle at which the wafer plane is arranged with respect to the entrance pupil plane of 70 degrees. The simulated plots on the left hand side of FIG. 13 illustrate the ray aberrations (in mm) across the field along the y axis of the pupil. The simulated plots on the right hand side of FIG. 13 illustrate the ray aberrations (in mm) across the field along the x axis of the pupil. From top to bottom, the plots are simulated for −1.00, −1.00 (x, y) relative field height, 1.00, 1.00 (x, y) relative field height, and 0.00, 0.00 (x, y) relative field height.

As shown in all of the plots for positive, negative, and axial field height along the y axis and the x axis, the ray aberrations are negligible. Therefore, the system embodiments described herein can be used to substantially correct the asymmetric focus and astigmatism errors across the field on an inclined wafer plane. In addition, by comparison of the plots shown in FIGS. 12 and 13, a set of optical elements configured according to embodiments described herein corrects even the substantial asymmetric focus errors seen in FIG. 12. Accordingly, the illumination optics described herein will have performance capabilities that are substantially better than the performance that can be achieved using centered optical systems incorporating spherical, aspheric, and cylindrical elements.

Figure 14:
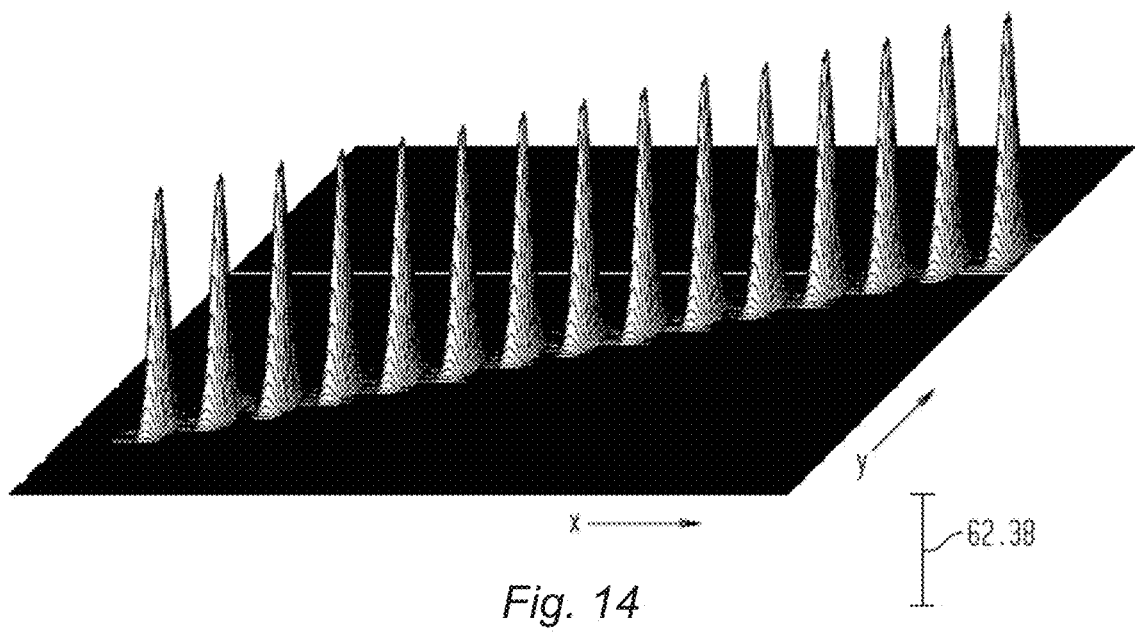
FIG. 14 is a simulated plot illustrating the point spread function (PSF) of spatially separated spots formed on a wafer plane by a system configured according to embodiments described herein.
Figure 15:
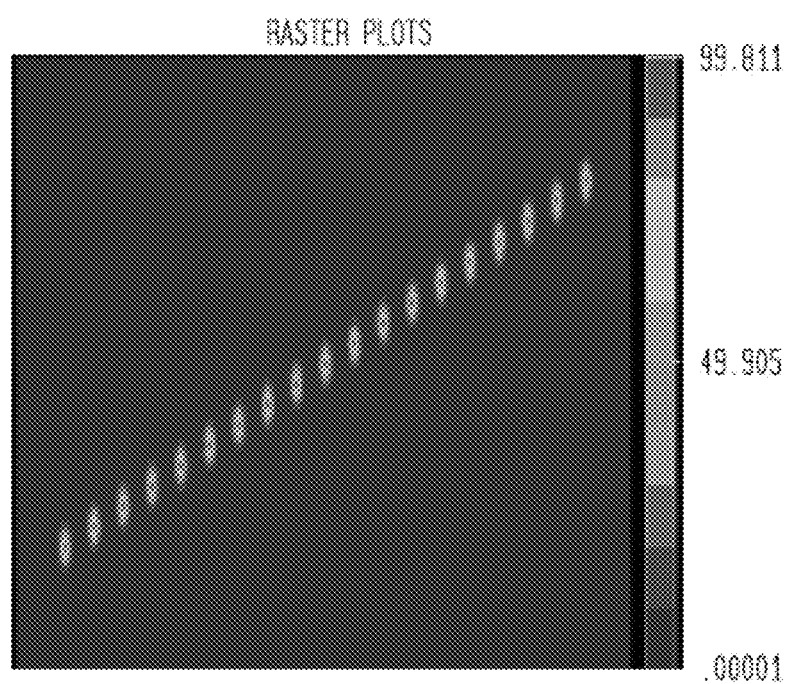
FIG. 15 is a simulated plot illustrating a raster diagram equivalent to the simulated plot of FIG. 14.

FIG. 14 is a simulated plot illustrating the point spread function (PSF) (i.e., image of a point source) for spatially separated spots formed on a tilted wafer plane by a system configured according to embodiments described herein. In particular, FIG. 14 shows the PSF of 15 out of 19 spatially separated spots that can be formed on a tilted wafer plane by the systems described herein. It is clear from this plot and the equivalent raster diagram shown in FIG. 15 that all of the spots have a perfectly formed Gaussian profile, elliptical shape, and equal intensity. This uniformity of illumination is another advantageous characteristic of the optical system configurations described herein.

It is essential for the future of unpatterned wafer inspection to devise systems with enhanced performance in terms of absolute defect sensitivity and the ability to reject background surface scattering due to roughness while maintaining current throughput levels. As described further above, the systems described herein meet both of these requirements in a design that is relatively simple, compact, and practical (at a spot size of about 3 microns×about 9 microns, each spot is about 20 times smaller than the smallest single spot presently used in the SP2 system, which is commercially available from KLA-Tencor, San Jose, Calif.).

Another embodiment relates to a method for providing illumination of a wafer for inspection. The method includes directing light to an entrance pupil. The light may be directed to the entrance pupil as described further above (e.g., using one or more optical elements such as optical element 102 shown in FIG. 10). The method also includes separating the light into individual beams at the entrance pupil. Separating the light into individual beams may be performed as described further above (e.g., using a DOE as shown in FIG. 10). The individual beams may be configured as described above (e.g., substantially collimated, etc.).

In addition, the method includes focusing the individual beams to a wafer plane to form spatially separated spots on the wafer plane. Focusing the individual beams to the wafer plane may be performed as described further above (e.g., using a set of optical elements as shown in FIG. 10). The spatially separated spots may be formed on the wafer plane as shown in FIG. 11. The spatially separated spots may be further configured as described above. For instance, the spots may be diffraction limited spots. The wafer plane is arranged at an oblique angle to the entrance pupil. The wafer plane may be arranged with respect to the entrance pupil as shown in FIG. 10. In one embodiment, focusing the individual beams to the wafer plane preferably includes correcting asymmetric focus error in the spots, which may be performed as described further above. Each of the embodiments of the method described above may be performed by any of the system embodiments described herein. In addition, each of the embodiments of the method described above may include any other step(s) described herein.

An additional embodiment relates to a system configured to inspect a wafer. The system includes one or more optical elements configured to direct light to an entrance pupil. The one or more optical elements may be configured as described above and shown in FIG. 10. In addition, the entrance pupil may be arranged as described above and shown in FIG. 10. This system also includes a DOE positioned at the entrance pupil. The DOE is configured to separate the light into individual beams. The DOE may be further configured as described above and shown in FIG. 10. In addition, the system includes a set of optical elements configured to focus the individual beams to a wafer plane to form spatially separated spots on the wafer plane. The wafer plane is arranged at an oblique angle to the entrance pupil. The wafer plane may be arranged with respect to the entrance pupil as described above and shown in FIG. 10.

The set of optical elements may be further configured as described above and shown in FIG. 10. Preferably, the set of optical elements may be configured to correct asymmetric focus error in the spots. The spots may be configured as shown in FIG. 11 and described further above. For example, the spots may be diffraction limited. In addition, a size of each of the spots may be approximately equal. The size of the spots may preferably be selected such that a substantial amount of light scattered from each of the spots is not light scattered from a rough surface of the wafer. Furthermore, the spots may be located within an area of the wafer plane such that an entire lateral dimension of the area is illuminated by the spots as the spots are scanned across the wafer plane.

The system further includes a detection subsystem that is configured to collect and detect light scattered from each of the spots. Signals generated by the detection subsystem in response to the detected light can be used to detect defects on the wafer. The detection subsystem may be further configured as described herein. The wafer may include a wafer such as an unpatterned wafer and a wafer having a relatively rough upper surface. Each of the embodiments of the inspection system described above may be further configured as described herein. For example, the inspection system may include a processor or computer system, which may be configured as described further herein. In addition, the inspection system will have all of the advantages of the illumination system described herein.

One embodiment of a system configured to collect and detect light scattered from a wafer includes a set of optical elements that is configured to collect light scattered from spatially separated spots formed on a wafer plane at an oblique angle of incidence. The wafer plane may be arranged as described further above and shown in FIG. 10. The oblique angle of incidence may be selected as described further above. The spatially separated spots may be configured as shown in FIG. 11. In addition, the spatially separated spots may be formed on the wafer plane at the oblique angle of incidence as described above (e.g., using a system configured to provide illumination of a wafer for inspection as shown in FIG. 10). The set of optical elements is also configured to focus the light to corresponding spatially separated positions in an image plane. In this manner, the set of optical elements maintains the spatial separation of the light scattered from the multiple spots from the wafer plane to the image plane.

Figure 16:
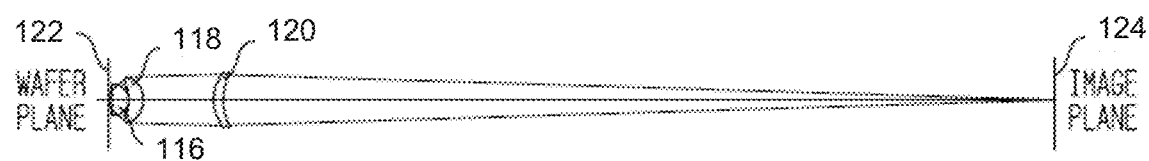
FIGS. 16 and 17 are schematic diagrams illustrating a cross-sectional view and a perspective view, respectively, of different embodiments of a set of optical elements configured to collect light scattered from spatially separated spots formed on a wafer plane at an oblique angle of incidence and to focus the light to corresponding spatially separated positions in an image plane.

One embodiment of a set of optical elements that is configured as described above is shown in FIG. 16. As shown in FIG. 16, the set of optical elements includes optical elements 116, 118, and 120. Optical element 116 is configured to collect light scattered from spatially separated spots (not shown in FIG. 16) formed on wafer plane 122 at an oblique angle of incidence. Optical element 118 is configured to direct the light collected by optical element 116 to optical element 120. Optical element 120 is configured to focus the light to spatially separated positions (not shown in FIG. 16) in image plane 124.

Optical elements 116, 118, and 120 include spherical/aspheric optical elements. In other words, each of the optical elements may have one spherical surface and one aspheric surface. The spherical/aspheric optical elements are configured as lenses or refractive optical elements. The lenses may be formed of any suitable refractive material known in the art that has adequate transmission properties at the chosen wavelength of operation. For simple construction of the systems described herein, the refractive index of optical element 116 may be rather high since more complex and/or less well corrected construction may result from a lower refractive index of optical element 116. A field size of the set of optical elements is preferably equal to or larger than an area in which the spots formed on the wafer plane are located. For instance, the field size of the set of optical elements may be about 140 microns in diameter for the above-described 19 illuminated spots on the wafer plane. The set of optical elements is preferably configured to generate highly corrected images at the spatially separated positions in the image plane.

A numerical aperture (NA) of the set of optical elements may be relatively high. For example, in one embodiment, the NA of the set of optical elements is equal to 0.94. In this manner, the NA of the set of optical elements enables an inspection system in which the collection and detection system is used to have relatively high sensitivity. In particular, the sensitivity of a system that includes the set of optical elements configured as described herein may be higher than the sensitivity of systems configured for collection and detection of light scattered from a single large spot or line on the wafer plane at an oblique or normal angle of incidence or multiple spots on the wafer plane at a normal angle of incidence.

As shown in FIG. 16, the set of optical elements may be positioned relatively close to wafer plane 122. Such proximity between the set of optical elements and the wafer plane is preferable due to the large NA of the optical elements. For example, due to the large NA, the diameter and thickness of the optical elements tend to grow rapidly unless the optical elements are brought substantially close to the wafer plane. Therefore, in system embodiments described herein, the distance between the wafer plane and the first optical element (e.g., optical element 116) may be kept at a minimum to provide adequate clearance, yet permit manageable lens sizes to be used in the system. Such proximity between the set of optical elements and the wafer plane produces an immediate conflict with the illumination optics described further above and shown in FIG. 10. In particular, the illumination optics are also located relatively close to the wafer plane.

Figure 17:
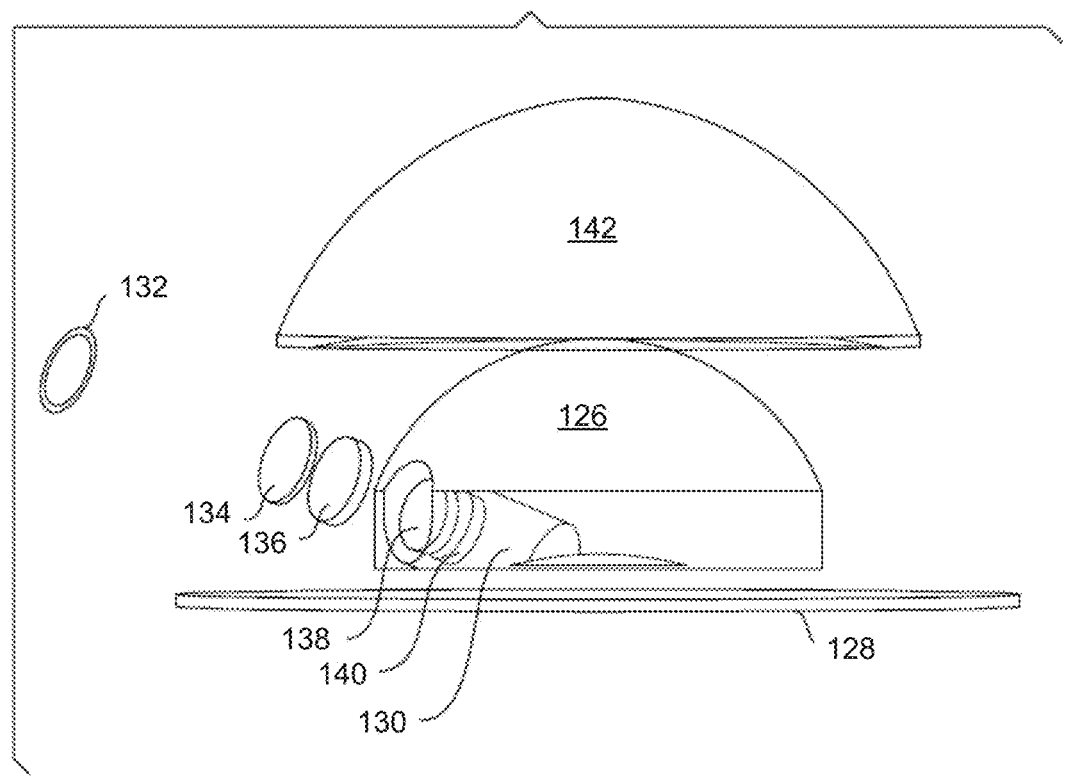

FIG. 17 illustrates another embodiment of the set of optical elements that provides a solution to overcome this problem. In particular, as shown in FIG. 17, the set of optical elements includes first optical element 126, which is located closest to wafer plane 128 and is configured to collect light scattered from the wafer plane. As further shown in FIG. 17, section 130 of the first optical element is removed such that light can be directed through section 130 to wafer plane 128 at the oblique angle of incidence. Section 130 may have a cylindrical or conical shape. In addition, section 130 may extend through the first optical element such that the light used for illumination does not interact with the first optical element. In this manner, the illumination may travel through free space within the removed section and one or more optical elements of the illumination subsystem that can be positioned within the removed section.

In particular, the illumination subsystem shown in FIG. 17 includes a set of optical elements that is configured to focus individual beams of light on wafer plane 128. Wafer plane 128 is arranged at an oblique angle to entrance pupil 132. A DOE (not shown in FIG. 17), which may be configured as described above, is positioned at the entrance pupil and is configured to separate the light into the individual beams. The set of optical elements includes optical elements 134, 136, 138, and 140, each of which may be configured as described above. For example, optical element 134 may be configured for use as a reference optical element. Optical elements 136 and 138 may be decentered and tilted with respect to the entrance pupil to correct asymmetric focus error in the spots formed on the wafer plane in a direction along a y axis of a plane of the entrance pupil. Optical element 140 may be decentered and tilted with respect to the entrance pupil to correct asymmetric focus error in the spots formed on the wafer plane in a direction along a x axis of the plane of the entrance pupil.

As further shown in FIG. 17, optical elements 138 and 140 are positioned in the removed section of first optical element 126. In this manner, the illumination optics are actually positioned within the collection optics. As such, the illumination optics are configured to direct light through section 130 to wafer plane 128. In this manner, the configuration of the collection optics allows compact integration with the above described tilted multi-spot illumination system.

The configuration of first optical element 126 shown in FIG. 17 results in some of the scattered light from the wafer plane being blocked mainly by the illumination optics and to a smaller extent by the removed section of the first optical element. However, by judicious profiling of the elements of the illumination optics and the cylindrical/conical removed section of the first optical element of the collection system, the obscuration of the scattered light may be kept to a minimum. For instance, the elements of the illumination subsystem may be designed to be as small as possible without compromising the performance of the illumination subsystem.

The system shown in FIG. 17 may be further configured as described herein. For instance, the collection and detection optics include optical element 142, which like optical element 118 described above, may be configured to direct the collected light to another optical element (not shown due to the scale of FIG. 17). This other optical element may be configured to focus the light to an image plane (not shown in FIG. 17) as described above. Therefore, this optical element may be configured as optical element 120 described above.

Figure 18:
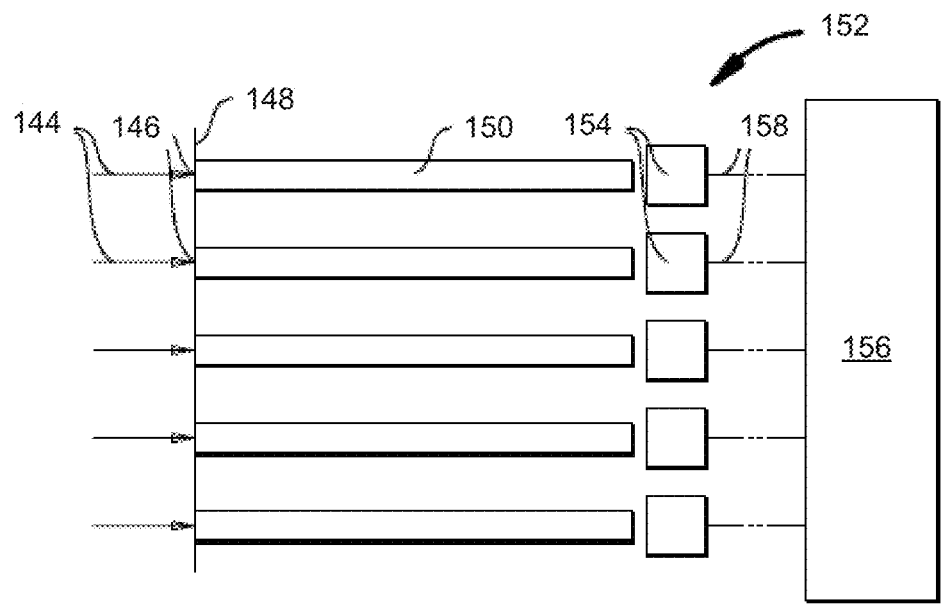
FIG. 18 is a schematic diagram illustrating a cross-sectional view of one embodiment of a detection subsystem and one embodiment of a set of optical fibers.

The system configured to collect and detect light scattered from a wafer also includes a detection subsystem that is configured to separately detect the light focused to the spatially separated positions in the image plane. One embodiment of a detection subsystem that can be used in the systems described herein is shown in FIG. 18. As shown in FIG. 18, light 144 scattered from spatially separated spots formed on a wafer plane (not shown in FIG. 18), which was collected by the set of optical elements described above, is focused to corresponding spatially separated positions 146 in image plane 148. Although only 5 spatially separated positions in the image plane are shown in FIG. 18, it is to be understood that the number of positions in the image plane to which light is focused will be equal to the number of spatially separated spots formed on the wafer plane (e.g., 19 spots and 19 spatially separated positions).

As further shown in FIG. 18, in one embodiment, the system may include a set of optical fibers 150. The set of optical fibers is configured to separately transmit the light from the spatially separated positions in the image plane to detection subsystem 152. In other words, individual optical fibers of the set are positioned such that each optical fiber receives light from one spatially separated position in the image plane. In this manner, each optical fiber preferably receives light from only one corresponding position in the image plane. Although only 5 optical fibers are shown in FIG. 18, the number of optical fibers included in the set is preferably equal to the number of spatially separated positions in the image plane to which light is focused.

As further shown in FIG. 18, the set of optical fibers may include a linear array of optical fibers. The linear array of optical fibers is preferably arranged at an angle of rotation with respect to the image plane such that the positions of the optical fibers correspond to the spatially separated positions in the image plane. In other words, the linear array of optical fibers is preferably arranged substantially parallel to the line along which the spatially separated positions are arranged in the image plane.

In one embodiment, the diameter of each of the optical fibers may be about 250 microns. The diameter of the optical fibers may be selected based on, for example, the size of the spots formed on the wafer plane, the magnification ratio of the collecting and focusing optics, and a selected magnification ratio for the system. In some embodiments, the magnification ratio of the system is greater than about 30×. In one such embodiment, based on the spot sizes described above, an optical fiber diameter of about 250 microns produces a magnification ratio of about 32×. The optical fibers may include any suitable optical fibers known in the art that have the selected diameter. Optical fibers having many different diameters are commercially available from various sources known in the art.

As further shown in FIG. 18, in one embodiment, detection subsystem 152 includes individual detectors 154 having positions that correspond to the spatially separated positions in the image plane. In other words, each of the individual detectors is configured to detect light from one position in the image plane. In this manner, each detector preferably detects light from only one position in the wafer plane. Therefore, although only 5 individual detectors are shown in FIG. 18, the number of individual detectors included in the detection subsystem is preferably equal to the number of spatially separated positions in the image plane to which light is focused. As shown in FIG. 18, when the system includes a set of optical fibers, each detector may actually detect the light transmitted by only one optical fiber of the set.

In addition, although the spacing between the optical fibers is shown in FIG. 18 to be relatively constant along the length of the optical fibers, it is to be understood that the spacing between the optical fibers may be different at the image plane and at the detection subsystem based on, for example, the separation between the positions in the wafer plane and the size of the individual detectors of the detection subsystem. Furthermore, although the individual detectors are shown in FIG. 18 arranged in a linear array corresponding to the linear array of the spatially separated positions in the image plane, it is to be understood that the individual detectors may be arranged in any manner (e.g., a two dimensional array) as long as the set of optical fibers can be arranged to direct light to the individual detectors. In this manner, the arrangement of the individual detectors does not have to reflect that of the spatially separated positions in the image plane and can be selected to improve the compactness of the system.

Each detector is configured to generate signals responsive to the light detected by the detector. In this manner, the detection subsystem is configured to generate different signals for the light focused to different positions in the image plane. As such, a different signal can be generated independently for the light scattered from each individual spot on the wafer plane. The signals generated by each detector may be responsive to, for example, an intensity of the light scattered from each of the spots formed on the wafer plane. However, the signals may be responsive to any measurable property of the light scattered from each of the spots formed on the wafer plane. Each of the individual detectors may be, for example, a charge coupled device (CCD) or any other suitable detector known in the art.

In an alternative embodiment, the system may not include the set of optical fibers. In such an embodiment, the detection subsystem may be configured to detect the light at the spatially separated positions in the image plane. For example, the individual detectors of the detection subsystem may be arranged such that the photosensitive areas of the detectors are located at the image plane.

In an additional embodiment, the detection subsystem may include multiple detectors as described above or a single detector that can separately detect the light focused to spatially separated positions in the image plane. For example, such a detector includes a multi-anode photomultiplier tube (PMT) or any other segmented detector known in the art. In this manner, the single detector preferably generates different signals for the light focused to each of the spatially separated positions in the image plane. Such a single segmented detector may also be used in the detection subsystem for system embodiments that include the set of optical fibers described above. In such embodiments, the individual photosensitive areas of the detector may be positioned as described above with respect to the set of optical fibers.

As shown in FIG. 18, each of the individual detectors may be coupled to processor 156 by transmission medium 158. The transmission media may include any suitable transmission media known in the art. In addition, one or more additional components (not shown) may be interposed between the detectors and the processor such as analog-to-digital converters. Processor 156 may be configured to separately process signals from different detectors. For instance, processor 156 may be configured to determine if signals from different detectors include defect signals. In this manner, the processor may be configured to separately analyze the light scattering signals for each spot on the wafer plane. The processor may be configured to detect defects on the wafer using any method or algorithm known in the art. The processor may also be configured to perform other defect-related functions such as defect classification. The processor may include any appropriate processor or computer system known in the art. For example, the processor may be configured to have parallel processing capability.

Figure 19:
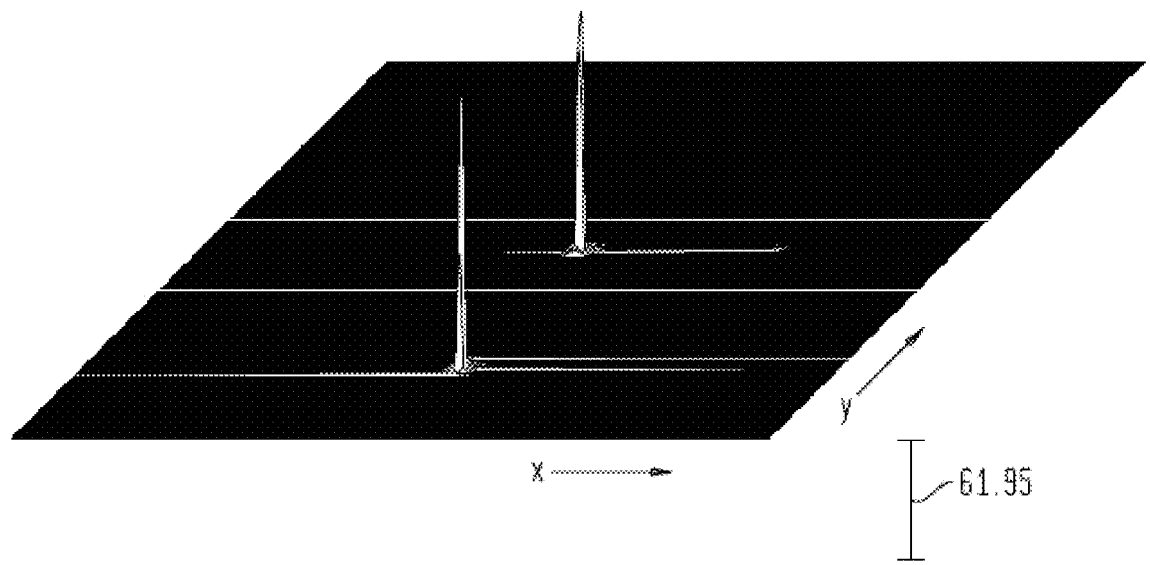
FIGS. 19 and 20 are simulated plots illustrating the energy distribution of light focused to two adjacent spatially separated positions in an image plane with in-focus and out-of-focus conditions, respectively.
Figure 20:
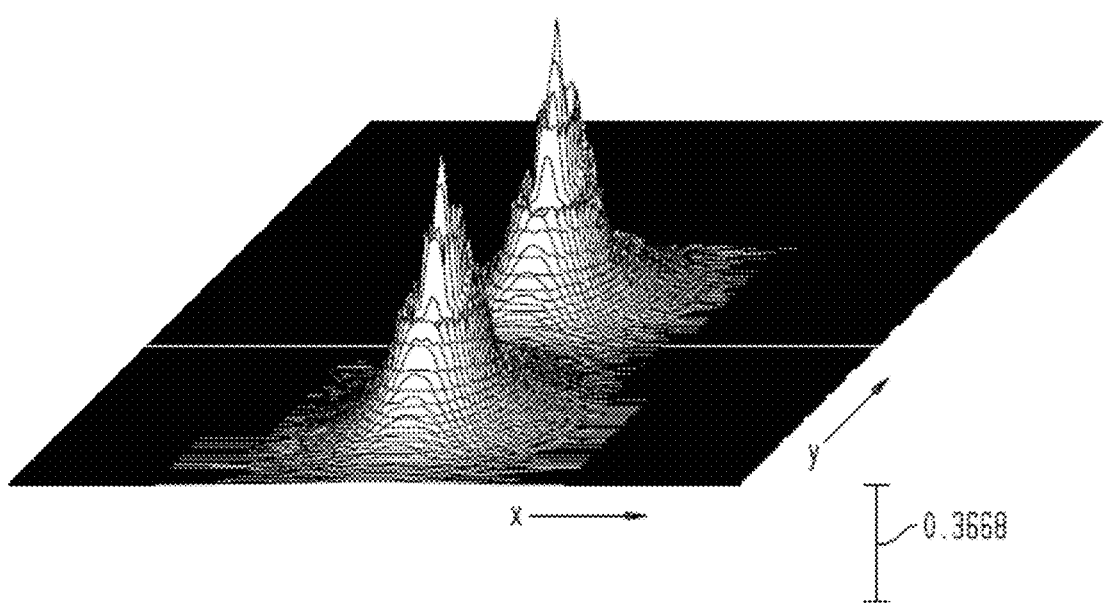

In one embodiment, the sets of optical elements shown in FIGS. 16 and 17 are overcorrected, or at least well corrected, to reduce degradation in imaging quality at the image plane due to focus error. For example, FIG. 19 illustrates the energy distribution at the input face of two adjacent detectors (or fibers). The energy distributions are shown for one position located at one end of the image plane and the position located adjacent to it. As shown in FIG. 19, the two images are well separated with no leakage of energy from one position to the other. This situation changes dramatically with a slight focus error in the plane of the wafer. This situation is shown in FIG. 20, where a 2 micron defocus of the wafer plane has caused a significant spread of the light in each position. Therefore, in the absence of focus compensation and with a relatively large NA, the system is preferably well corrected to counteract the significant degradation of the image quality due to even relatively small amounts of focus error. For example, the system is diffraction limited as described further above. Therefore, the system is well corrected. In addition, as described further above, the aberrations in the system are negligible. The system may also have a Strehl ratio of about 90% or greater.

A system configured to collect and detect light scattered from a wafer as described above, therefore, can be used with an illumination system configured according to embodiments described herein for a multi-spot obliquely illuminated wafer plane. The system also advantageously includes all-refractive relatively simple imaging optics for use with the highly inclined wafer illumination optics. In addition, the collection and detection system provides a substantially high NA (e.g., equal to 0.94) system with relatively high sensitivity to both un-patterned and rough wafer surfaces. Furthermore, neither single spot or line illumination based collection systems nor normally illuminated multi-spot based collection systems are suitable as collectors for use with the highly inclined multi-spot illumination optics described herein. Therefore, the collection and detection systems described herein provide a solution for such illumination systems for which no other solution is currently available. As such, the collection and detection systems described herein will have the same advantages as those of the illumination systems described further above.

The systems described herein for collection and detection of light scattered from a wafer may be included in an inspection system. For example, in one embodiment, a system configured to inspect a wafer includes an illumination subsystem that is configured to direct light to a wafer plane at an oblique angle of incidence to form spatially separated spots on the wafer plane. The illumination subsystem may be further configured according to the embodiments described herein and shown in FIG. 10.

The inspection system also includes a set of optical elements configured to collect light scattered from the spots and to focus the collected light to corresponding spatially separated positions in an image plane. The set of optical elements may be configured according to embodiments described herein and shown in FIGS. 16 and 17. For example, an NA of the set of optical elements may be equal to 0.94. In addition, a field size of the set of optical elements may be equal to or larger than an area in which the spots on the wafer plane are located. Furthermore, the set of optical elements may include a first optical element, and a section of the first optical element may be removed. In such an embodiment, the illumination subsystem may be configured to direct the light through the section to the wafer plane. Moreover, the set of optical elements may be overcorrected to reduce degradation in imaging quality at the image plane due to focus error.

The inspection system further includes a detection subsystem configured to separately detect the light focused to the spatially separated positions in the image plane. In one embodiment, the system includes a set of optical fibers configured to separately transmit the light from the spatially separated positions in the image plane to the detection subsystem. The detection subsystem and the set of optical fibers may be configured according to embodiments described herein and shown in FIG. 18. For example, the detection subsystem may include individual detectors having positions that correspond to the spatially separated positions in the image plane. As described above, signals generated by the detection subsystem in response to the detected light can be used to detect defects on the wafer. The wafer may include wafers such as an unpatterned wafer and a wafer having a relatively rough surface. The inspection system may be further configured as described herein. In addition, the inspection system will have all of the advantages of the illumination system and the collection and detection system described herein.

An additional embodiment relates to a method for collecting and detecting light scattered from a wafer. The method includes collecting light scattered from spatially separated spots formed on a wafer plane at an oblique angle of incidence. Collecting the light scattered from the spatially separated spots may be performed as described above and shown in FIGS. 16 and 17. The spatially separated spots may be formed on the wafer plane using an illumination system configured as described above and shown in FIG. 10. The spatially separated spots may be formed on the wafer plane as shown in FIG. 11.

The method also includes focusing the light to corresponding spatially separated positions in an image plane. Focusing the light may be performed as described above and shown in FIGS. 16 and 17. In addition, the method includes separately detecting the light focused to the spatially separated positions in the image plane. Separately detecting the light may be performed as described herein and shown in FIG. 18.

The method may include any other step(s) described herein. For example, the method may include directing light through a removed section of an optical element, used for collecting the scattered light, to the wafer plane at the oblique angle of incidence to form the spatially separated spots on the wafer plane. The light may be directed in such a manner as described herein and shown in FIG. 17. In another example, the method may include separately transmitting the light from the spatially separated positions in the image plane to the detection subsystem. Separately transmitting the light from the spatially separated positions may be performed as described herein and shown in FIG. 18. In addition, the method may be performed by any of the system embodiments described herein.

In some embodiments, the systems described herein may be configured as a "stand alone tool" or a tool that is not physically coupled to a process tool. However, such a system may be coupled to the process tool by a transmission medium, which may include wired and wireless portions. The process tool may include any process tool known in the art such as a lithography tool, an etch tool, a deposition tool, a polishing tool, a plating tool, a cleaning tool, or an ion implantation tool. The process tool may be configured as a "cluster tool" or a number of process modules coupled by a common handler.

The results of inspection performed by the systems described herein may be used to alter a parameter of a process or a process tool using a feedback control technique, a feedforward control technique, or an in situ control technique. The parameter of the process or the process tool may be altered manually or automatically.

Further modifications and alternative embodiments of various aspects of the invention may be apparent to those skilled in the art in view of this description. For example, systems and methods for inspection of a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to inspect a specimen, comprising:
an illumination subsystem configured to illuminate the specimen by scanning multiple spots across the specimen simultaneously, wherein the illumination subsystem comprises a diffractive optical element configured to separate light from a light source into individual beams, a set of optical elements configured to focus the individual beams to form the multiple spots on the specimen, and one or more elements configured to direct the light from the light source to an entrance pupil, and wherein the diffractive optical element is positioned in the entrance pupil;
a non-imaging detection subsystem configured to generate output signals responsive to light scattered from the multiple spots scanned across the specimen, wherein the non-imaging detection subsystem comprises non-imaging optics configured to collect the light scattered from the multiple spots scanned across the specimen and one or more non-imaging detectors configured to generate the output signals; and
a processor configured to generate digital images of the specimen using the output signals and to detect defects on the specimen using the digital images.

2. The system of claim 1, wherein the non-imaging optics comprise an objective, wherein the one or more non-imaging detectors comprise a detector, and wherein a numerical aperture of the objective does not match a pixel size of the detector.

3. The system of claim 1, wherein the non-imaging optics comprise an objective having a numerical aperture of greater than about 0.05.

4. The system of claim 1, wherein the system is further configured to select a sampling frequency of the non-imaging detection subsystem to substantially eliminate aliasing effects in the digital images.

5. The system of claim 1, wherein the one or more non-imaging detectors comprise an avalanche photodiode or a photomultiplier tube.

6. The system of claim 1, wherein the illumination subsystem further comprises a narrowband light source.

7. The system of claim 1, wherein the illumination subsystem further comprises a laser configured to generate light that is used to illuminate the specimen.

8. The system of claim 1, wherein the processor is further configured to perform automatic defect classification.

9. The system of claim 1, wherein the processor is further configured to determine if the defects are nuisance defects.

10. The system of claim 1, wherein the non-imaging detection subsystem is further configured to simultaneously generate the output signals responsive to the light scattered from the multiple spots scanned across the specimen, and wherein the processor is further configured to detect the defects on the specimen using the digital images generated using the output signals responsive to the light scattered from the multiple spots.

11. The system of claim 10, wherein the one or more non-imaging detectors comprise two or more non-imaging detectors, wherein each of the two or more non-imaging detectors is dedicated to generating the output signals responsive to the light scattered from one of the multiple spots scanned across the specimen, and wherein said each of the two or more non-imaging detectors is a photomultiplier tube.

12. The system of claim 1, further comprising an additional non-imaging detection subsystem configured to generate additional output signals responsive to the light scattered from the multiple spots scanned across the specimen, wherein the processor is further configured to detect the defects on the specimen using the additional output signals.

13. The system of claim 1, further comprising an additional non-imaging detection subsystem configured to generate additional output signals responsive to the light scattered from the multiple spots scanned across the specimen, wherein the non-imaging detection subsystem and the additional non-imaging detection subsystem are further configured to generate the output signals and the additional output signals substantially simultaneously.

14. The system of claim 13, wherein the non-imaging detection subsystem and the additional non-imaging detection subsystem are coupled to different objectives.

15. The system of claim 13, wherein the non-imaging detection subsystem and the additional non-imaging detection subsystem are further configured to detect the light scattered at different angles from the multiple spots scanned across the specimen.

16. The system of claim 1, wherein the system further comprises an additional non-imaging detection subsystem configured to simultaneously generate additional output signals responsive to the light scattered from the multiple spots scanned across the specimen, and wherein the processor is further configured to detect the defects on the specimen using the additional output signals.

17. The system of claim 16, wherein the additional non-imaging detection subsystem is further configured to generate the additional output signals while the non-imaging detection subsystem is generating the output signals.

18. The system of claim 1, wherein the specimen comprises a patterned wafer or a non-patterned wafer, and wherein the non-patterned wafer comprises a wafer having a film formed thereon, a bare silicon wafer, or a wafer having a resist formed thereon.

19. The system of claim 1, wherein the non-imaging optics comprise an objective configured to collect the light scattered from the multiple spots and a fiber configured to collect light collected by the objective and to direct the light to a detector of the one or more non-imaging detectors configured to generate the output signals.

20. The system of claim 1, wherein the one or more non-imaging detectors comprise two or more non-imaging detectors, wherein the non-imaging detection subsystem further comprises multiple fibers, and wherein each of the two or more non-imaging detectors is dedicated to generating the output signals responsive to the light scattered from one of the multiple spots scanned across the specimen and collected by one of the multiple fibers.

21. The system of claim 20, wherein each of the two or more non-imaging detectors is coupled to its own analog-to-digital converter, and wherein the processor is further configured to receive the output signals generated by the two or more non-imaging detectors after the output signals have been processed by the analog-to-digital converters.

22. The system of claim 21, wherein the processor is further configured to separately process the output signals generated by the two or more non-imaging detectors after the output signals have been processed by the analog-to-digital converters.

23. The system of claim 22, wherein the processor is further configured to have parallel processing capability.

24. The system of claim 1, wherein the illumination subsystem further comprises a broadband light source.

25. The system of claim 1, wherein the illumination subsystem further comprises a light source configured to emit light at a wavelength of about 355 nm.

26. The system of claim 1, wherein the illumination subsystem is further configured to direct the light to the multiple spots at different oblique angles of incidence.

27. The system of claim 1, wherein the illumination subsystem further comprises one or more mirrors configured to direct the light from the light source to an objective.

28. The system of claim 1, wherein the illumination subsystem further comprises an aperture configured to control a size of the multiple spots directed to the specimen.

29. The system of claim 1, wherein the illumination subsystem further comprises an aperture configured to control a size of the multiple spots directed to the specimen, and wherein the aperture is a controllable aperture.

30. The system of claim 1, wherein the non-imaging detection subsystem further comprises multiple fibers configured to collect and direct the light scattered from the multiple spots to the one or more non-imaging detectors.

31. The system of claim 1, wherein the non-imaging detection subsystem further comprises multiple fibers configured to collect and direct the light scattered from the multiple spots to multiple non-imaging detectors included in the one or more non-imaging detectors, and wherein a number of the multiple fibers is equal to a number of the multiple non-imaging detectors such that each of the multiple non-imaging detectors is dedicated to generating the output signals responsive to the light collected by one of the multiple fibers.

32. The system of claim 1, wherein a numerical aperture used for illumination of the specimen by the illumination subsystem is different than a numerical aperture used for detection by the non-imaging detection subsystem.

33. The system of claim 1, wherein the illumination subsystem further comprises multiple fibers configured to direct the light from the light source to an objective.

34. The system of claim 1, wherein the one or more non-imaging detectors comprise a non-imaging detector array.

35. The system of claim 1, wherein the one or more non-imaging detectors comprise a multi-channel non-imaging detector array.

36. The system of claim 1, wherein the one or more non-imaging detectors comprise a multi-anode photomultiplier tube.

37. The system of claim 1, wherein the illumination subsystem is further configured to direct the light from the light source to a polarizer.

38. The system of claim 1, wherein the illumination subsystem is further configured to illuminate different specimens with light having different polarizations.

39. The system of claim 1, further comprising an array of fibers configured to collect the light scattered from the multiple spots scanned across the specimen, wherein the system is further configured to scan the light scattered from the multiple spots across the array in a direction relative to a scan direction based on sampling of the one or more non-imaging detectors of the non-imaging detection subsystem in a different direction.

40. The system of claim 39, wherein the processor is further configured for time-domain sampling of the output signals generated by the one or more non-imaging detectors based on sampling in the scan direction.

41. The system of claim 1, further comprising an additional non-imaging detection subsystem configured to generate additional output signals responsive to light specularly reflected from the multiple spots scanned across the specimen.

42. The system of claim 1, wherein the illumination subsystem and the non-imaging detection subsystem include different objectives.

43. The system of claim 1, wherein an angle at which the light scattered from the multiple spots is collected and detected by the non-imaging detection subsystem is determined based on one or more characteristics of illumination, one or more characteristics of the specimen, one or more characteristics of the defects of interest, or a combination thereof.

44. The system of claim 1, wherein the illumination subsystem is further configured to illuminate the specimen by steering an illumination beam using an acousto-optic deflector.

45. The system of claim 1, wherein the non-imaging detection subsystem further comprises a beam splitter.

46. The system of claim 1, wherein the non-imaging detection subsystem further comprises a birefringent optical component.

47. The system of claim 1, wherein the illumination subsystem is further configured to direct the individual beams to the multiple spots at an oblique angle of incidence.

48. The system of claim 47, wherein the oblique angle of incidence is about 70 degrees.

49. The system of claim 1, wherein the individual beams have approximately equal intensity.

50. The system of claim 1, wherein the multiple spots have uniform characteristics.

51. The system of claim 1, wherein each of the multiple spots has a Gaussian profile.

52. The system of claim 1, wherein an intensity of each of the multiple spots is approximately equal.

53. The system of claim 1, wherein a size of each of the multiple spots is approximately equal.

54. The system of claim 1, wherein the set of optical elements comprises one or more truncated optical elements.

55. The system of claim 1, wherein the multiple spots are located within an area of the specimen such that an entire lateral dimension of the area is illuminated by the multiple spots as the spots are scanned across the specimen.

56. The system of claim 1, wherein the diffractive optical element has an efficiency from about 65% to about 75%.

57. The system of claim 1, wherein the diffractive optical element is a diffraction grating configured to generate a two-dimensional array of the individual beams.

58. The system of claim 1, wherein each of the multiple spots formed on the specimen have an elliptical shape.

59. The system of claim 58, wherein each of the multiple spots have a major axis to minor axis ratio of about 3:1.

60. The system of claim 1, wherein the illumination subsystem further comprises scanning optics configured to scan the multiple spots across the specimen while the specimen is being translated.

61. The system of claim 1, wherein the multiple spots comprise 15 spots scanned across the specimen simultaneously.

62. The system of claim 1, wherein the multiple spots comprise at least 3 spots.

63. The system of claim 1, wherein the multiple spots comprise spatially separated spots formed on the specimen at an oblique angle of incidence, wherein the non-imaging optics comprise an additional set of optical elements configured to collect light scattered from the spatially separated spots and to focus the light to corresponding spatially separated positions in an image plane, and wherein the one or more non-imaging detectors are further configured to separately detect the light focused to the spatially separated positions in the image plane.

64. The system of claim 63, further comprising a set of optical fibers configured to separately transmit the light from the spatially separated positions in the image plane to the one or more non-imaging detectors.

65. The system of claim 64, wherein the set of optical fibers comprises a linear array of optical fibers.

66. The system of claim 64, wherein a diameter of each of the optical fibers is about 250 microns.

67. The system of claim 64, wherein a spacing between the optical fibers is constant along a length of the optical fibers.

68. The system of claim 64, wherein a spacing between the optical fibers is different at the image plane and at the detection subsystem.

69. The system of claim 63, wherein the one or more non-imaging detectors comprise individual detectors having positions that correspond to the spatially separated positions in the image plane, and wherein each of the individual detectors is configured to generate signals responsive to the light detected by said each of the individual detectors such that the non-imaging detection subsystem is further configured to generate different output signals for the light focused to different spatially separated positions in the image plane and to independently generate a different signal for the light scattered from each of the spatially separated spots on the specimen.

70. The system of claim 69, wherein the individual detectors are arranged in a linear array corresponding to a linear array of the spatially separated positions in the image plane.

71. The system of claim 69, wherein an arrangement of the individual detectors does not reflect that of the spatially separated positions in the image plane.

72. The system of claim 63, wherein a field size of the additional set of optical elements is equal to or larger than an area in which the spatially separated spots formed on the specimen are located.

73. The system of claim 63, wherein the additional set of optical elements comprises refractive optical elements.

74. The system of claim 1, wherein the illumination subsystem further comprises a monochromatic laser.

75. The system of claim 1, wherein the illumination subsystem is further configured to illuminate the specimen by directing the light to the multiple spots at a normal angle of incidence, wherein the system further comprises an additional illumination subsystem configured to illuminate the specimen by directing additional light to the multiple spots at an oblique angle of incidence, and wherein the illumination and additional illumination subsystems comprise different objectives.

76. The system of claim 1, wherein the multiple spots are arranged in a one-dimensional array on the specimen.

77. The system of claim 1, wherein the multiple spots are arranged in a two-dimensional array on the specimen.

78. The system of claim 1, wherein the one or more nod-imaging detectors comprise multiple detectors, and wherein each detector detects the light scattered from the multiple spots scanned across the specimen at different wavelengths or wavebands.

79. The system of claim 78, wherein the non-imaging detection subsystem further comprises a dispersive optical component configured to separate the light scattered from the multiple spots scanned across the specimen into one or more near vacuum ultraviolet wavelengths, one or more deep ultraviolet wavelengths, one or more ultraviolet wavelengths, one or more visible wavelengths, or some combination thereof.

80. The system of claim 1, wherein the illumination subsystem further comprises one or more beam shaping elements.

81. The system of claim 1, wherein the illumination subsystem further comprises a beam expanding lens.

82. The system of claim 1, wherein the non-imaging optics comprise spherical optical elements.

83. The system of claim 1, wherein the non-imaging optics comprise aspheric optical elements.

84. The system of claim 1, wherein the system has a Strehl ratio of about 90% or greater.

85. A system configured to inspect a specimen, comprising:
an illumination subsystem configured to illuminate the specimen by scanning multiple spots across the specimen simultaneously, wherein the illumination subsystem comprises a diffractive optical element configured to separate light from a light source into individual beams, a set of optical elements configured to focus the individual beams to form the multiple spots on the specimen, and one or more elements configured to direct the light from the light source to an entrance pupil, and wherein the diffractive optical element is positioned in the entrance pupil;
non-imaging optics comprising an objective configured to collect light scattered from the multiple spots scanned across the specimen, wherein a numerical aperture of the objective is greater than about 0.05;
a non-imaging detector configured to detect the light collected by the objective and to generate amplified output signals responsive to the detected light, wherein the numerical aperture of the objective is not matched to a pixel size of the non-imaging detector; and
a processor configured to generate digital images of the specimen using the amplified output signals and to detect defects on the specimen using the digital images.

86. A method for inspecting a specimen, comprising:
illuminating the specimen by scanning multiple spots across the specimen simultaneously with an illumination subsystem, wherein the illumination subsystem comprises a diffractive optical element configured to separate light from a light source into individual beams, a set of optical elements configured to focus the individual beams to form the multiple spots on the specimen, and one or more elements configured to direct the light from the light source to an entrance pupil, and wherein the diffractive optical element is positioned in the entrance pupil;
generating non-image output signals responsive to light scattered from the multiple spots scanned across the specimen, wherein said generating is performed by a non-imaging detection subsystem, wherein said non-imaging detection subsystem comprises non-imaging optics configured to collect the light scattered from the multiple spots scanned across the specimen and one or more non-imaging detectors configured to generate the non-image output signals;
generating digital images of the specimen using the non-image output signals; and
detecting defects on the specimen using the digital images.

* * * * *